US009386216B2

(12) United States Patent
Inoue

(10) Patent No.: US 9,386,216 B2
(45) Date of Patent: Jul. 5, 2016

(54) IMAGING DEVICE, DEFOCUS AMOUNT CALCULATING METHOD, AND IMAGING OPTICAL SYSTEM

(71) Applicant: FUJIFILM Corporation, Tokyo (JP)

(72) Inventor: Kazuki Inoue, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/709,653

(22) Filed: May 12, 2015

(65) Prior Publication Data

US 2015/0244926 A1 Aug. 27, 2015

Related U.S. Application Data

(63) Continuation of application No. PCT/JP2013/073391, filed on Aug. 30, 2013.

(30) Foreign Application Priority Data

Nov. 22, 2012 (JP) ................. 2012-256349

(51) Int. Cl.
*H04N 5/232* (2006.01)
*G02B 7/34* (2006.01)
*G03B 13/36* (2006.01)
*G02B 13/00* (2006.01)
(Continued)

(52) U.S. Cl.
CPC .............. *H04N 5/23212* (2013.01); *G02B 7/34* (2013.01); *G02B 13/001* (2013.01); *G03B 13/36* (2013.01); *H04N 5/2254* (2013.01); *H04N 5/3696* (2013.01)

(58) Field of Classification Search
None
See application file for complete search history.

(56) References Cited

U.S. PATENT DOCUMENTS 8,471,952 B2 * 6/2013 Awazu ............... H04N 5/23212
348/350
8,730,380 B2 * 5/2014 Uchida ................. G03B 13/36
348/345
8,831,420 B2 * 9/2014 Miyatani ............... G03B 13/36
396/104

(Continued)

FOREIGN PATENT DOCUMENTS

JP 5-333263 A 12/1993
JP 2008-275712 A 11/2008

(Continued)

OTHER PUBLICATIONS

International Search Report, issued in PCT/JP2013/073391, dated Nov. 26, 2013. 1.

(Continued)

*Primary Examiner* — Michael Osinski
(74) *Attorney, Agent, or Firm* — Birch, Stewart, Kolasch & Birch, LLP

(57) ABSTRACT

The camera main body 200 stores sensitivity ratio data indicating a sensitivity ratio of a pixel 51R in the position and an imaging pixel 51 which is adjacent to the pixel 51R and a sensitivity ratio of a pixel 51L in the position and a pixel 51 which is adjacent to the pixel 51L, for every information of the different incident light ray angles in the arbitrary position of a light receiving surface 50 in an X direction. The system control unit 11 obtains information of the incident light ray angle in two positions on the light receiving surface 50 corresponding to the set optical condition and corrects the level difference of the output signals of the pixels 51R and 51L using the sensitivity ratio data corresponding to the obtained incident light ray angle.

8 Claims, 13 Drawing Sheets

(51) Int. Cl.
H04N 5/369 (2011.01)
H04N 5/225 (2006.01)

(56) References Cited

U.S. PATENT DOCUMENTS

| | | | | |
|---|---|---|---|---|
| 8,885,089 | B2* | 11/2014 | Aoki | G02B 7/34 |
| | | | | 348/208.12 |
| 9,019,424 | B2* | 4/2015 | Kimura | G03B 13/36 |
| | | | | 250/208.1 |
| 9,083,877 | B2* | 7/2015 | Ogawa | H04N 5/23212 |
| 9,094,602 | B2* | 7/2015 | Kunugi | H04N 5/23212 |
| 9,106,824 | B2* | 8/2015 | Endo | H04N 5/23212 |
| 9,167,133 | B2* | 10/2015 | Matsunaga | H04N 5/2176 |
| 9,167,152 | B2* | 10/2015 | Inoue | G02B 7/28 |
| 9,172,925 | B2* | 10/2015 | Sugawara | G02B 7/34 |
| 9,184,197 | B2* | 11/2015 | Kusaka | H01L 27/14621 |
| 9,237,319 | B2* | 1/2016 | Sawadaishi | G02B 7/34 |
| 9,288,384 | B2* | 3/2016 | Aoki | G02B 7/34 |
| 2005/0275904 | A1* | 12/2005 | Kido | G06T 5/50 |
| | | | | 358/461 |
| 2010/0302433 | A1* | 12/2010 | Egawa | G02B 7/34 |
| | | | | 348/345 |
| 2011/0091192 | A1* | 4/2011 | Iwane | G02B 7/34 |
| | | | | 396/113 |
| 2011/0164169 | A1 | 7/2011 | Yamasaki | |
| 2011/0273608 | A1 | 11/2011 | Tsukada | |
| 2013/0021517 | A1* | 1/2013 | Ui | H04N 5/3696 |
| | | | | 348/345 |
| 2013/0021519 | A1* | 1/2013 | Hamada | G03B 13/36 |
| | | | | 348/349 |
| 2013/0120644 | A1* | 5/2013 | Fujii | G02B 7/36 |
| | | | | 348/349 |
| 2014/0211076 | A1* | 7/2014 | Inoue | G02B 7/34 |
| | | | | 348/349 |
| 2014/0218594 | A1* | 8/2014 | Hirose | G02B 7/34 |
| | | | | 348/349 |
| 2015/0062374 | A1* | 3/2015 | Okazawa | G02B 7/34 |
| | | | | 348/229.1 |
| 2015/0181108 | A1* | 6/2015 | Endo | G02B 7/34 |
| | | | | 348/345 |
| 2015/0256778 | A1* | 9/2015 | Kusaka | G03B 13/36 |
| | | | | 348/302 |
| 2015/0264251 | A1* | 9/2015 | Ito | G02B 7/34 |
| | | | | 348/345 |
| 2015/0264324 | A1* | 9/2015 | Sugawara | H04N 5/3696 |
| | | | | 348/302 |
| 2016/0014327 | A1* | 1/2016 | Iwasaki | H04N 5/23212 |
| | | | | 348/349 |
| 2016/0088245 | A1* | 3/2016 | Nakata | H04N 5/3696 |
| | | | | 250/201.2 |

FOREIGN PATENT DOCUMENTS

| | | |
|---|---|---|
| JP | 2010-26178 A | 2/2010 |
| JP | 2010-107771 A | 5/2010 |
| JP | 2011-164370 A | 8/2011 |
| JP | 2012-4729 A | 1/2012 |

OTHER PUBLICATIONS

Written Opinion of the International Searching Authority, issued in PCT/JP2013/073391, dated Nov. 26, 2013.

* cited by examiner

| OPTICAL CONDITION 1 | HORIZONTAL PIXEL POSITION | | | |
|---|---|---|---|---|
|  | x1 | x2 | x3 | x4 |
| UPPER LIGHT RAY ANGLE | $\theta 1a$ | $\theta 2a$ | $\theta 3a$ | $\theta 4a$ |
| LOWER LIGHT RAY ANGLE | $\theta 1b$ | $\theta 2b$ | $\theta 3b$ | $\theta 4b$ |

FIG. 8

|  |  | UPPER LIGHT RAY ANGLE | | | | |
|---|---|---|---|---|---|---|
|  |  | $\theta 1a$ | $\theta 2a$ | $\theta 3a$ | $\theta 4a$ | · · · |
| LOWER LIGHT RAY ANGLE | $\theta 1b$ | L1,R1 | L3,R3 |  |  |  |
|  | $\theta 2b$ | L2,R2 |  |  |  |  |
|  | $\theta 3b$ |  |  |  |  |  |
|  | $\theta 4b$ |  |  |  |  |  |
|  | · |  |  |  |  |  |

IMAGING DEVICE, DEFOCUS AMOUNT CALCULATING METHOD, AND IMAGING OPTICAL SYSTEM

CROSS REFERENCE TO RELATED APPLICATION

This is a continuation of International Application No. PCT/JP2013/073391 filed on Aug. 30, 2013, and claims priority from Japanese Patent Application No. 2012-256349, filed on Nov. 22, 2012, the entire disclosures of which are incorporated herein by reference.

BACKGROUND

1. Technical Field

The present invention relates to an imaging device, a defocus amount calculating method, and an imaging optical system.

2. Related Art

Recently, as the resolution of a solid state imaging element such as a charge coupled device (CCD) image sensor and a complementary metal oxide semiconductor (CMOS) image sensor becomes higher, a demand for an information device having an imaging function such as a digital still camera, a digital video camera, a cellular phone such as a smart phone, and a personal digital assistant (PDA) is rapidly increasing. Further, the information device having an imaging function as described above is referred to as an imaging device.

In such an imaging device, as a focus control method which detects a distance to a major subject to focus on the major subject, a contrast auto focus (AF) method or a phase difference AF method is employed. Since the phase difference AF method may detect a focusing position at a high speed as compared with the contrast AF method, the phase difference AF method is widely employed in various imaging devices (for example, see Patent Literatures 1 to 3).

Patent Literature 1 (JP-A-2010-26178) discloses an imaging device which has some of the pixels included in an imaging element as a phase difference detecting pixel and performs the phase difference AF using a signal read out from the phase difference detecting pixel. Patent Literature 1 discloses that a gain difference is caused between a pair of image signals which are targets for calculating a phase difference, due to lens vignetting and a method which corrects the gain difference based on a pixel output ratio distribution in each pixel of the pair of image signals whose phases match.

Further, Patent Literature 2 (JP-A-2010-107771) and Patent Literature 3 (JP-A-2008-275712) disclose an imaging device which corrects data which causes degradation of phase difference AF precision, using a correction value generated for every lens and then performs phase difference AF so as to improve AF precision.

SUMMARY OF INVENTION

Technical Problem

As pixels for phase difference detection, at least two types of pixels that include a right pixel which detects light passing through, for example, a right half of a pupil area of a photographing optical system and a left pixel which detects light passing through, for example, a left half of the pupil area of the photographing optical system are used. Due to different incident angle sensitivity characteristics of the right pixel and the left pixel, even if image heights (a distance from a point intersecting an optical axis of the photographing optical system in a region where pixels are arranged) of the imaging elements are equal to each other, the sensitivities may be different from each other. That is, the levels of a pair of output signals of the phase difference detecting pixels which are arranged to be adjacent to each other may be different from each other.

Patent Literature 1 discloses a method which obtains a gain difference of a pair of image signals obtained by imaging and corrects the gain difference. However, according to the method, since the gain difference is arithmetically operated from the signals obtained by imaging, an arithmetic operation amount until the gain difference is corrected is increased, which lowers an AF speed.

In Patent Literatures 2 and 3, the correction of the level difference of the pair of output signals of the phase difference detecting pixels is not considered.

The present invention has been made in an effort to provide an imaging device and a defocus amount calculating method which are capable of precisely correcting a level difference of a pair of output signals of phase difference detecting pixels with a simple configuration to improve a phase difference AF speed and phase difference AF precision.

Solution to Problem

It is an imaging device of the present invention with an imaging optical system being attachable to/detachable from the imaging device, the imaging device comprising: an imaging element including a light receiving surface, on which a plurality of imaging pixels that captures an image formed by a luminous flux passing through a pupil area of the imaging optical system, a plurality of first phase difference detecting pixels that captures one of a pair of images formed by a pair of luminous fluxes which have passed through different parts of the pupil area of the imaging optical system, and a plurality of second phase difference detecting pixels that captures the other one of the pair of images, are disposed; and a first storing unit that stores sensitivity ratio data indicating a sensitivity ratio of the first phase difference detecting pixel at an arbitrary position and the imaging pixel which is adjacent to the first phase difference detecting pixel and a sensitivity ratio of the second phase difference detecting pixel at an arbitrary position and the imaging pixel which is adjacent to the second phase difference detecting pixel, for every information of different incident light ray angles in an arbitrary position in an off-centered direction of the pair of images of the light receiving surface, wherein the imaging optical system includes a second storing unit that stores the information of the incident light ray angle of the light ray which is incident in at least two positions in the off-centered direction of the light receiving surface, through the imaging optical system, for every optical condition of the imaging optical system, and wherein the imaging device further includes: a correcting unit that obtains the information of the incident light ray angle in the at least two positions corresponding to the set optical condition from the second storing unit and corrects a level difference of the output signals of a pair of the first phase difference detecting pixel and the second pixel difference detecting pixel which is adjacent to the first phase difference detecting pixel using the sensitivity ratio data which is stored in the first storing unit corresponding to the information of the plurality of obtained incident light ray angles; and a defocus amount calculating unit that calculates a defocus amount using the corrected output signal of the pair.

It is a defocus amount calculating method of the present invention by an imaging device with an imaging optical system being attached to/detached from the imaging device, wherein the imaging device includes: an imaging element including a light receiving surface, on which a plurality of imaging pixels that captures an image formed by a luminous flux passing through a pupil area of the imaging optical system, a plurality of first phase difference detecting pixels that captures one of a pair of images formed by a pair of luminous fluxes which have passed through different parts of the pupil area of the imaging optical system, and a plurality of second phase difference detecting pixels that captures the other one of the pair of images, are disposed; and a first storing unit that stores sensitivity ratio data indicating a sensitivity ratio of the first phase difference detecting pixel at an arbitrary position and the imaging pixel which is adjacent to the first phase difference detecting pixel and a sensitivity ratio of the second phase difference detecting pixel at an arbitrary position and the imaging pixel which is adjacent to the second phase difference detecting pixel, for every information of different incident light ray angles in an arbitrary position in the off-centered direction of the pair of images of the light receiving surface, wherein the imaging optical system includes a second storing unit that stores the information of the incident light ray angle of the light ray which is incident in at least two positions in the off-centered direction of the light receiving surface, through the imaging optical system, for every optical condition of the imaging optical system, and wherein the method includes: a correcting step of obtaining the information of the incident light ray angle in the at least two positions corresponding to a set optical condition from the second storing unit and correcting a level difference of the output signals of a pair of the first phase difference detecting pixel and the second pixel difference detecting pixel which is adjacent to the first phase difference detecting pixel using the sensitivity ratio data which is stored in the first storing unit corresponding to the information of the plurality of obtained incident light ray angles; and a defocus amount calculating step of calculating a defocus amount using the corrected output signal of the pair.

It is an imaging optical system of the present invention mounted in an imaging device having mounting equipment and comprising the second storing unit.

Advantageous Effects of Invention

According to the present invention, it is possible to provide an imaging device and a defocus amount calculating method which are capable of precisely correcting a level difference of a pair of output signals of phase difference detecting pixels with a simple configuration to improve a phase difference AF speed and phase difference AF precision.

BRIEF DESCRIPTION OF DRAWINGS

FIG. 8 is a view illustrating an example of a table stored in a main memory 16 of a camera main body 200.

DESCRIPTION OF EMBODIMENTS

Hereinafter, an embodiment of the present invention will be described with reference to the drawings.

Figure 1:
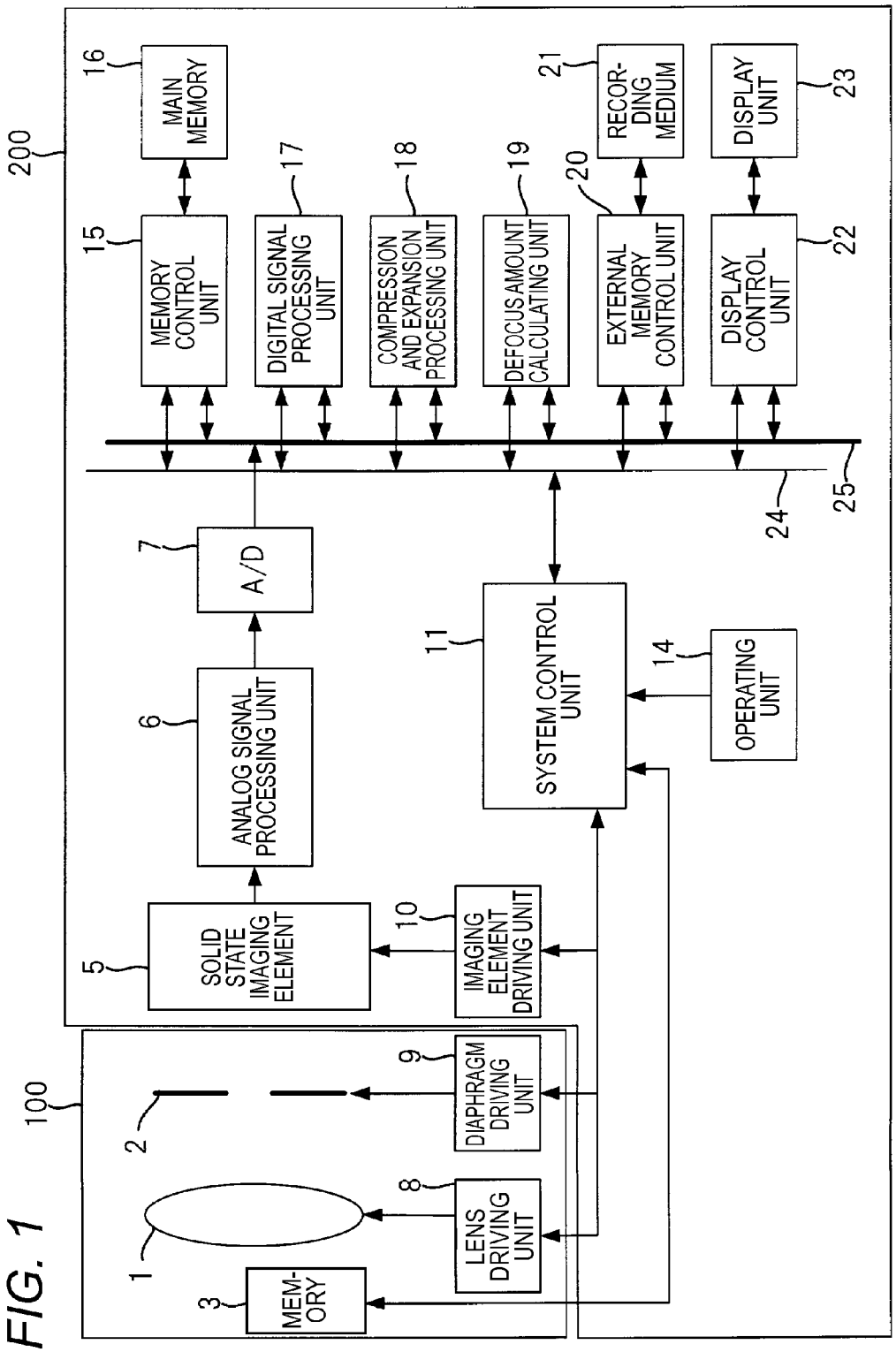
FIG. 1 is a diagram illustrating a schematic configuration of a digital camera as an example of an imaging device for explaining an embodiment of the present invention.

FIG. 1 is a diagram illustrating a schematic configuration of a digital camera as an example of an imaging device for explaining an embodiment of the present invention.

A digital camera illustrated in FIG. 1 includes a lens device 100 as an imaging optical system and a camera main body 200 including a mounting equipment (not illustrated) on which the lens device 100 is mounted.

The lens device 100 includes a photographing lens 1 including a focus lens and a zoom lens, a diaphragm 2, a memory 3, a lens driving unit 8, and a lens driving unit 9.

The lens device 100 is attachable to the camera main body and may be replaced with another lens device. The memory 3 is accessed by a system control unit 11 of the camera main body 200 which will be described below.

The camera main body 200 includes a CCD type or a CMOS type solid state imaging element 5 which is provided at the rear side of the lens device 100, an analog signal processing unit 6 which is connected to an output of the solid state imaging element 5 to perform an analog signal processing such as correlated double sampling processing and an A/D converting circuit 7 which converts an analog signal output from the analog signal processing unit 6 into a digital signal. The analog signal processing unit 6 and the A/D converting circuit 7 are controlled by the system control unit 11. The analog signal processing unit 6 and the A/D converting circuit 7 are embedded in the solid state imaging element 5 in some cases.

The system control unit 11, which totally controls the entire electric control system of the digital camera, controls the lens driving unit 8 so as to adjust a position of a focus lens which is included in the photographing lens 1 or to adjust a position of the zoom lens which is included in the photographing lens 1. Further, the system control unit 11 controls an aperture size of the diaphragm 2 through a diaphragm driving unit 9 so as to adjust an exposure amount.

Further, the system control unit 11 drives the solid state imaging element 5 through an imaging element driving unit 10 and outputs a subject image captured through the photographing lens 1 as a captured image signal. An instruction signal from a user is input to the system control unit 11 through an operating unit 14.

Moreover, the electrical control system of the digital camera includes a main memory 16, a memory control unit 15 which is connected to the main memory 16, a digital signal processing unit 17 which performs an interpolation operation, a gamma correction operation, and an RGB/YC conversion processing on a captured imaging signal output from the A/D converting circuit 7 to generate photographed image data, a compression and expansion processing unit 18 which compresses the photographed image data generated in the digital signal processing unit 17 in a JPEG format or expands the compressed image data, a defocus amount calculating unit 19 which calculates a defocus amount, an external memory control unit 20 to which a detachable recording medium 21 is connected, and a display control unit 22 to which a display unit 23 mounted on a rear surface of a camera is connected. The memory control unit 15, the digital signal processing unit 17, the compression and expansion processing unit 18, the defocus amount calculating unit 19, the external memory control unit 20, and the display control unit 22 are connected to each other by a control bus 24 and a data bus 25 to be controlled by a command from the system control unit 11.

Figure 2:
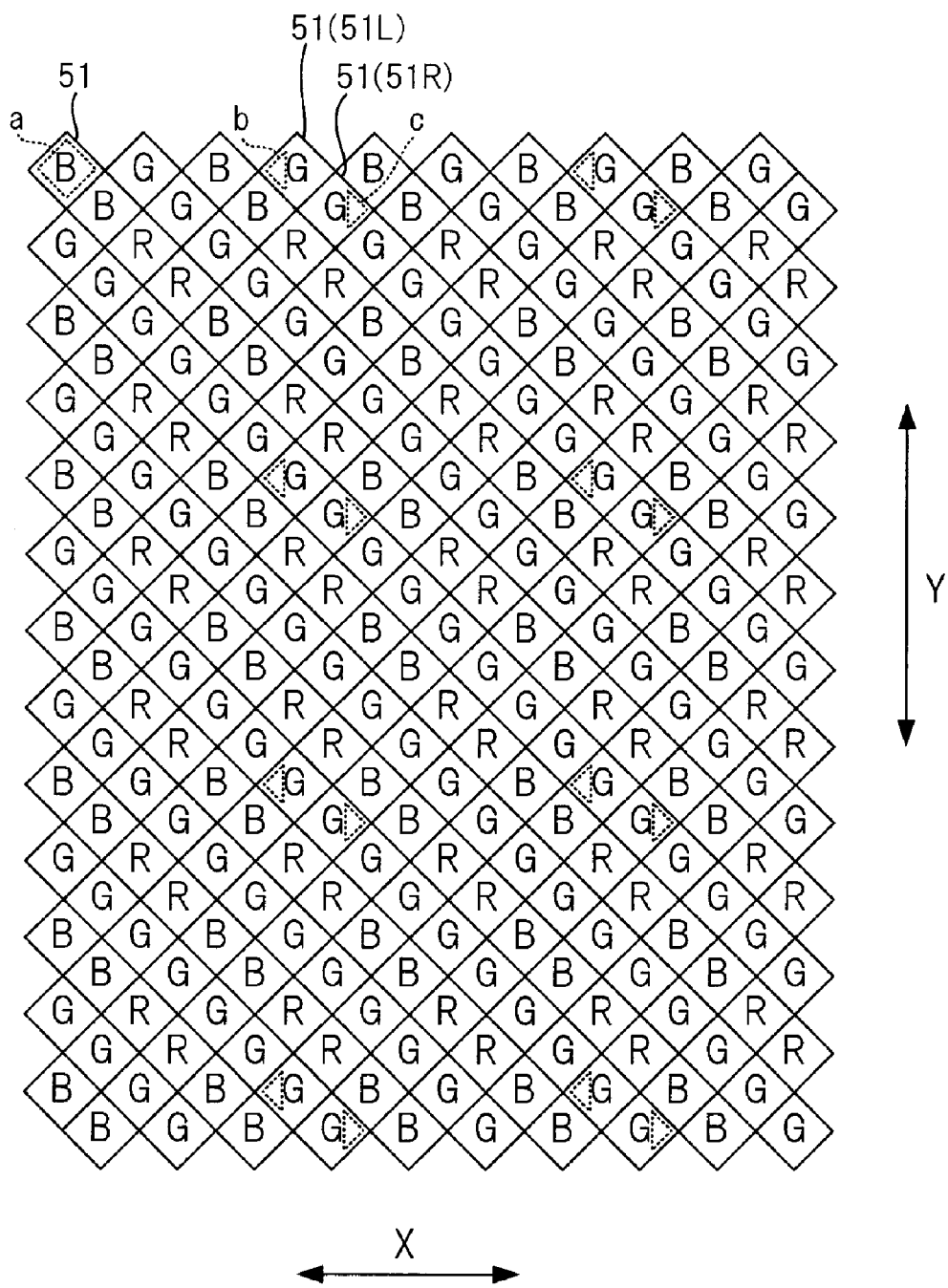
FIG. 2 is a partial enlarged view illustrating a plane configuration of a solid state imaging element 5 which is mounted in the digital camera illustrated in FIG. 1.

FIG. 2 is a partial enlarged view illustrating a plane configuration of the solid state imaging element 5 which is mounted in the digital camera illustrated in FIG. 1.

The solid state imaging element 5 includes a plurality of pixels 51 (square shape blocks in the drawing) which is two-dimensionally arranged in a row direction X and a column direction Y, which is perpendicular to the row direction X. Even though all pixels 51 are not illustrated in FIG. 2, actually, several millions to tens of millions of pixels 51 are two-dimensionally arranged. When an image is captured by the solid state imaging element 5, output signals from a plurality of pixels 51 are individually obtained. A set of the plurality of output signals is referred to as a captured image signal in this specification.

Each pixel 51 includes a photoelectric converting unit such as a photo diode and a color filter which is formed above the photoelectric converting unit.

In FIG. 2, a pixel 51 including a color filter which transmits a red light is denoted by a reference symbol "R", a pixel 51 including a color filter which transmits a green light is denoted by a reference symbol "G", and a pixel 51 including a color filter which transmits a blue light is denoted by a reference symbol "B".

The plurality of pixels 51 is arranged such that a plurality of pixel rows including a plurality of pixels 51 which is lined up in a row direction X is lined up in a column direction Y. Odd numbered pixel rows and even numbered pixel rows are off-centered by approximately a half of an arrangement pitch of the pixels 51 of each pixel row in the row direction X.

The arrangement of the color filters which are included in each pixel 51 of an odd-numbered pixel row is entirely a Bayer arrangement. Further, the arrangement of the color filters which are included in each pixel 51 of an even-numbered pixel row is entirely a Bayer arrangement. A pixel 51 existing in an odd-numbered row and a pixel 51 which detects the same color light as the pixel 51 and is adjacent to the pixel 51 at a lower right side form a pair pixel.

According to the solid state imaging element 5 having such a pixel arrangement, output signals of two pixels 51 which form the pair pixel are added to achieve a high sensitivity of the camera or exposure times of the two pixels 51 which configure the pair pixel are changed and output signals of the two pixels 51 are added to achieve a wide dynamic range of a camera.

In the solid state imaging element 5, some of the plurality of pixels 51 serve as phase difference detecting pixels.

The phase difference detecting pixels include a plurality of phase difference detecting pixels 51R and a plurality of phase difference detecting pixels 51L.

The plurality of phase difference detecting pixels 51R receives one (for example, a luminous flux which has passed through a right half of the pupil area) of a pair of luminous fluxes which have passed through different parts of a pupil area of the photographing lens 1 and outputs a signal in accordance with an amount of received light. That is, the plurality of phase difference detecting pixels 51R provided in the solid state imaging element 5 captures an image formed by one of the pair of luminous fluxes.

The plurality of phase difference detecting pixels 51L receives the other one (for example, a luminous flux which has passed through a left half of the pupil area) of the pair of luminous fluxes and outputs a signal in accordance with an amount of received light. That is, the plurality of phase difference detecting pixels 51L provided in the solid state imaging element 5 captures an image formed by the other one of the pair of luminous fluxes.

In the meantime, a plurality of pixels 51 (hereinafter, referred to as imaging pixels) other than the phase difference detecting pixels 51R and 51L captures an image formed by a luminous flux which passes through almost all parts of the pupil area of the photographing lens 1.

A light shielding layer is provided above the photoelectric converting unit of the pixel 51 and an opening which defines a light receiving area of the photoelectric converting unit is formed in the light shielding layer.

A center of the opening (denoted by reference symbol "a" in FIG. 2) of the imaging pixel 51 coincides with a center (a center of a square block) of the photoelectric converting unit of the imaging pixel 51. In the meantime, in FIG. 2, in order to simplify the drawing, the opening a is illustrated only in a part of the imaging pixels 51.

On the contrary, a center of an opening (denoted by reference symbol c in FIG. 2) of the phase difference detecting pixel 51R is off-centered to the right with respect to the center of the photoelectric converting unit of the phase difference detecting pixel 51R.

A center of an opening (denoted by reference symbol b in FIG. 2) of the phase difference detecting pixel 51L is off-centered to the left with respect to the center of the photoelectric converting unit of the phase difference detecting pixel 51L.

In the solid state imaging element 5, some of the pixels 51 on which a green color filter is mounted serve as the phase difference detecting pixels 51R or the phase difference detecting pixels 51L. Of course, a pixel on which a color filter having a different color is mounted may serve as the phase difference detecting pixel.

The pair of the phase difference detecting pixel 51R and the phase difference detecting pixel 51L which is arranged to be adjacent to the phase difference detecting pixel 51R (hereinafter, referred to as a phase difference pair) are discretely and periodically arranged in a light receiving surface 50 on which the pixels 51 are disposed.

In the present specification, the two adjacent pixels refer to two pixels which are adjacent to each other to such an extent that light may be considered as being received from substantially the same subject part. Further, since the phase difference detecting pixel 51R and the phase difference detecting pixel 51L which form the phase difference pair are adjacent to each other, the positions of the pixels in the row direction X (hereinafter, also referred to as horizontal pixel positions) are treated as being the same.

The phase difference detecting pixels 51R are disposed at three pixel intervals in the row direction X in some (four pixel rows which are lined up at three pixel row intervals in the example of FIG. 2) of the even-numbered pixel rows, in the example of FIG. 2.

In the example of FIG. 2, the phase difference detecting pixels 51L are disposed in the same cycle as the phase difference detecting pixels 51R in the row direction X in some (pixel rows next to the pixel rows including the phase difference detecting pixels 51R) of the odd-numbered pixel rows.

With this configuration, among lights which pass through the apertures b of the light shielding layer to be received by the phase difference detecting pixels 51L, the light at the left side as seen from the subject of the photographing lens 1 which is provided in the upper portion of the sheet of FIG. 2, that is, the light entering from a direction in which the subject is watched with a right eye becomes main. Further, among the lights which pass through the apertures c of the light shielding layer to be received by the phase difference detecting pixels 51R, the light at the right side as seen from the subject of the photographing lens 1, that is, the light entering from a direction in which the subject is watched with a left eye becomes main.

That is, a captured image signal when the subject is seen with the left eye is capable of being obtained by all the phase difference detecting pixels 51R and a captured image signal when the subject is seen with the right eye is capable of being obtained by all the phase difference detecting pixels 51L. Therefore, it becomes possible to generate stereoscopic image data of the subject by combining both the image signals or to generate phase difference information by correlating both the image signals.

Further, the phase difference detecting pixels 51R and the phase difference detecting pixels 51L cause the apertures of the light shielding layer to be off-centered in opposite directions so that the apertures are capable of receiving the luminous fluxes which pass through the different parts of the pupil areas of the photographing lens 1, respectively, so as to obtain phase difference information. However, a structure for obtaining the phase difference information is not limited thereto, but other known structures may be employed.

Figure 3:
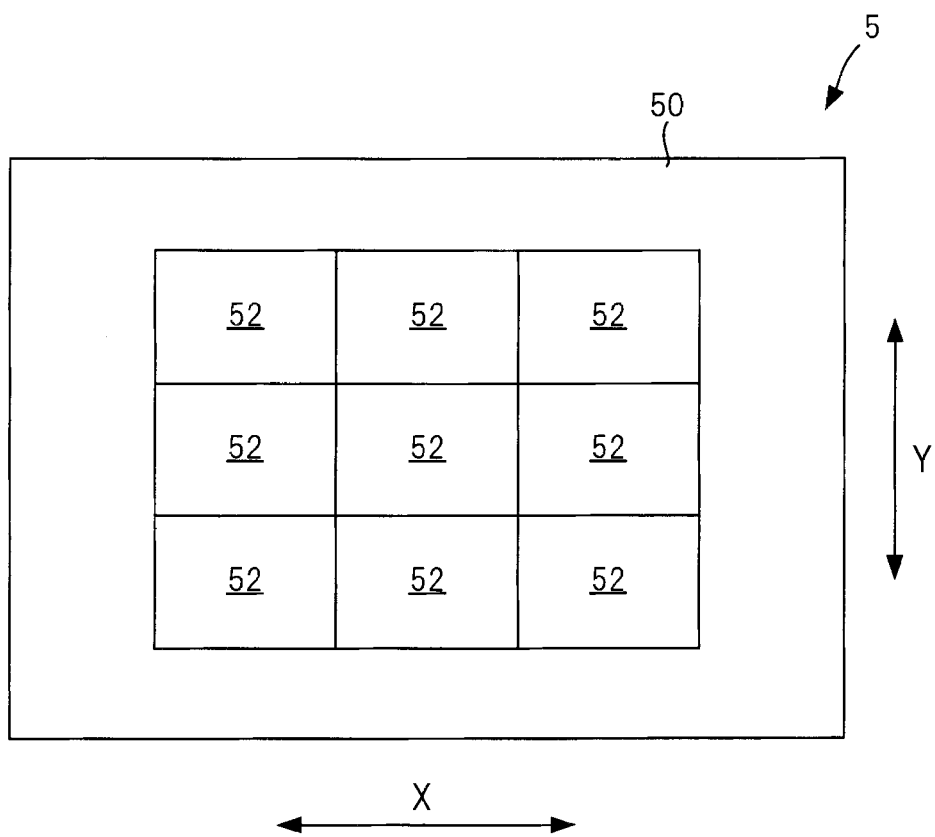
FIG. 3 is a schematic plan view illustrating an entire configuration of a solid state imaging element 5 which is mounted in the digital camera illustrated in FIG. 1.

FIG. 3 is a schematic plan view illustrating an entire configuration of a solid state imaging element 5 which is mounted in the digital camera illustrated in FIG. 1.

The solid state imaging element 5 has a light receiving surface 50 on which all the pixels 51 are disposed. Further, nine phase difference detecting regions (AF regions) 52 which become targets for phase difference detection are provided on the light receiving surface 50 in the example of FIG. 2.

An AF region 52 refers to a region which includes a plurality of phase difference pairs which is arranged in the row direction X. Only imaging pixels 51 are disposed in a portion of the light receiving surface 50 excluding the AF region 52.

Among nine AF regions 52 illustrated in FIG. 2, each of three AF regions 52 at the center of the row direction X is a region which passes through an intersection of the light receiving surface 50 with an optical axis of the imaging lens 1 as seen from a plan view and has a width in the row direction X across a straight line extending in the column direction Y. A position of the intersection of the light receiving surface 50 with the optical axis of the imaging lens 1 in the row direction X is referred to as an optical axis position.

The defocus amount calculating unit 19 illustrated in FIG. 1 calculates a phase difference amount which is a relative off-centered amount of two images formed by the pair of luminous fluxes using an output signal group which is read from the phase difference detecting pixel 51L and the phase difference detecting pixel 51R in one AF region 52 selected by, for example, the user's manipulation from the nine AF regions 52. Further, based on the phase difference amount, a focus adjusted state of the photographing lens 1, in this case, an amount by which the photographing lens 1 deviates from a focused state and a direction thereof, that is, a defocus amount is calculated.

The system control unit 11 illustrated in FIG. 1 moves a focus lens included in the imaging lens 1 to a focusing position based on the defocus amount calculated by the defocus amount calculating unit 19, so as to control the focused state of the imaging lens 1.

Apertures of the phase difference detecting pixels 51R and the phase difference detecting pixels 51L are off-centered in opposite directions. Therefore, even if positions of the apertures in the off-centered direction (the off-centered direction of the pair of images, the row direction X of FIG. 2) are substantially the same, a sensitivity difference may occur between the phase difference detecting pixels 51R and the phase difference detecting pixels 51L.

Figure 4:
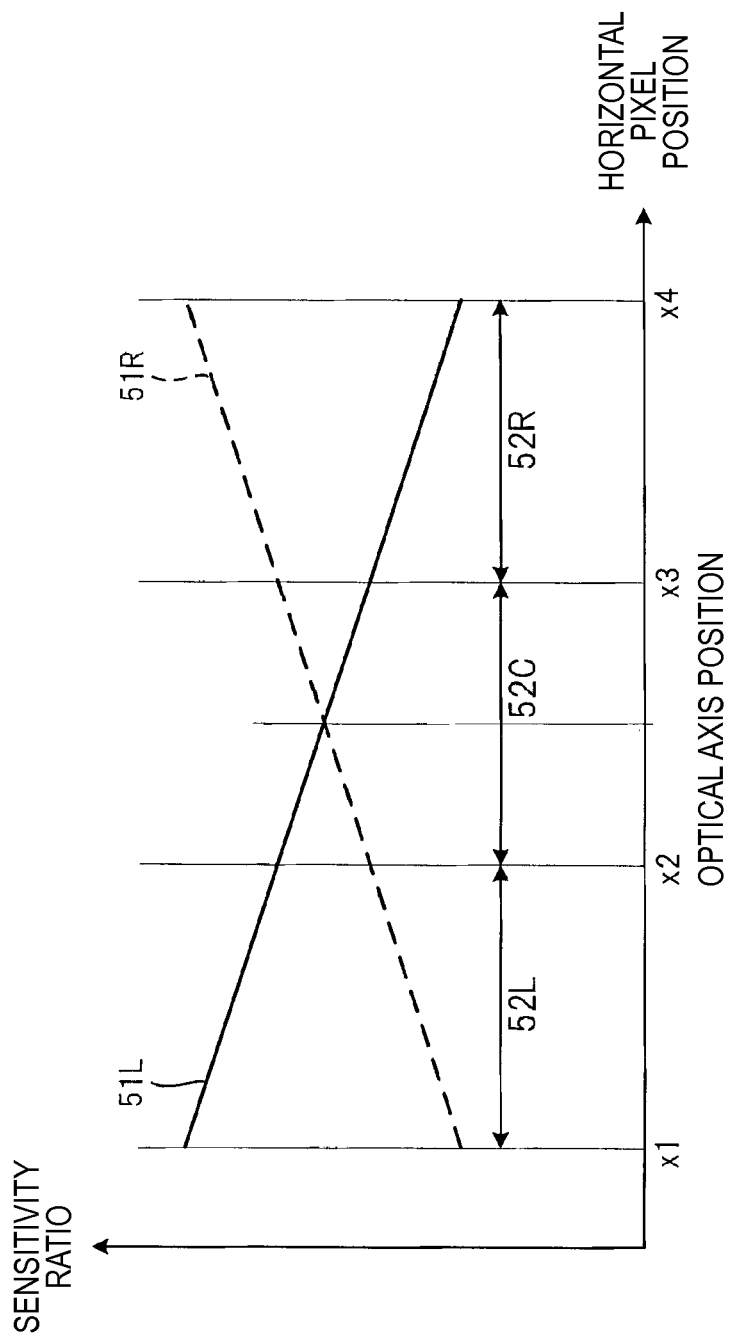
FIG. 4 is a view illustrating a sensitivity ratio of phase difference detecting pixels 51R and 51L in a position (a horizontal pixel position) of a solid state imaging element 5 in a row direction X.

FIG. 4 is a view illustrating a sensitivity ratio of phase difference detecting pixels 51R and 51L which form a phase difference pair in an arbitrary position (hereinafter, also referred to as a horizontal pixel position) of the row direction X in the solid state imaging element 5.

A straight line indicated by reference symbol 51R, in FIG. 4, represents a sensitivity ratio of the phase difference detecting pixel 51R and a straight line indicated by reference symbol 51L represents a sensitivity ratio of the phase difference detecting pixel 51L.

When an output signal of an arbitrary phase difference detecting pixel is A and an output signal of an imaging pixel (detects the same color light as the arbitrary phase difference detecting pixel) which is adjacent to the arbitrary phase difference detecting pixel is B, the sensitivity ratio of the arbitrary phase difference detecting pixel refers to a value represented by A/B or B/A. In FIG. 4, the sensitivity ratio is NB.

In FIG. 4, a range of the horizontal pixel positions of three AF regions 52 disposed at the left end in FIG. 3 is denoted by reference symbol 52L. Further, a range of the horizontal pixel positions of three AF regions 52 disposed at the center in FIG. 3 is denoted by reference symbol 52C. Furthermore, a range of the horizontal pixel positions of three AF regions 52 disposed at the right end in FIG. 3 is denoted by reference symbol 52R.

In FIG. 4, the horizontal pixel position at the left end of the range 52L is denoted by x1, the horizontal pixel position at the right end of the range 52L is denoted by x2, the horizontal pixel position at the right end of the range 52C is denoted by x3, and the horizontal pixel position at the right end of the range 52R is denoted by x4.

The phase difference detecting pixels 51R and 51L are periodically arranged in the column direction Y, as well. However, apertures of the phase difference detecting pixel 51R and the phase difference detecting pixel 51L are not off-centered in the column direction Y, so that the sensitivity ratio is as illustrated in FIG. 4, in any position of the column direction Y.

Since the output signal of the phase difference detecting pixels 51R and the output signal of the phase difference detecting pixels 51L individually have different levels for every horizontal pixel position in accordance with the subject, a distribution of the sensitivity of the phase difference detecting pixel is not known. However, as illustrated in FIG. 4, when the sensitivity ratio which is a ratio of the output signals of the phase difference detecting pixels and the imaging pixels which are adjacent to the phase difference detecting pixels is obtained, the distribution of the sensitivity of the phase difference detecting pixel may be understood.

Figure 5:
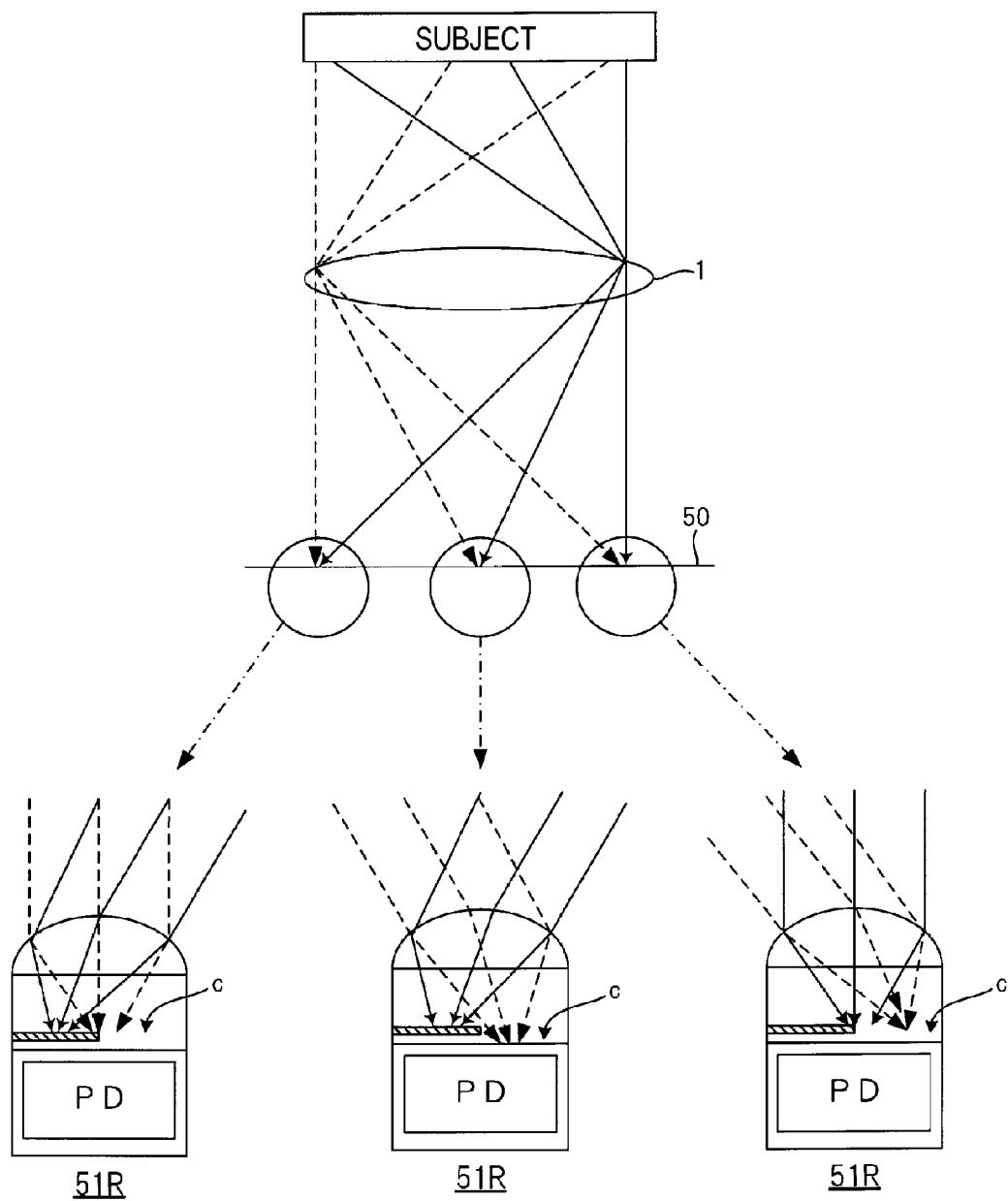
FIG. 5 is a view for explaining the sensitivity ratio of FIG. 4.

The apertures c of the phase difference detecting pixels 51R are off-centered to the right in FIG. 2. Therefore, as illustrated in FIG. 5, half of the lights which pass through the left of the photographing lens 1 enters the aperture c of the phase difference detecting pixel 51R which is at the left end of the light receiving surface 50 but the lights which pass through the right of the photographing lens 1 do not enter the aperture c. In the meantime, half of the lights which pass through the right of the photographing lens 1 enter the aperture c of the phase difference detecting pixel 51R which is at the right end of the light receiving surface 50 but all the lights which pass through the left of the photographing lens 1 enter the aperture c. Further, only the lights which pass through the left of the photographing lens 1 enter the aperture c of the phase difference detecting pixel 51R which is at the center of the light receiving surface 50 but the light which passes through the right of the photographing lens 1 does not enter the aperture c.

Further, the aperture b of the phase difference detecting pixel 51L is off-centered in an opposite direction of the phase difference detecting pixel 51R in the row direction X, so that the characteristic of the sensitivity ratio of the phase difference detecting pixel 51L is opposite to that of the phase difference detecting pixel 51R.

Therefore, as illustrated in FIG. 4, the sensitivity ratio of the phase difference detecting pixel 51L is lowered from the left end of the light receiving surface 50 toward the right end. Further, the sensitivity ratio of the phase difference detecting pixel 51R is increased from the left end of the light receiving surface 50 toward the right end.

Further, near the center (a portion which passes through a portion of the light receiving surface 50 intersecting the optical axis of the imaging lens 1 and overlaps the straight line extending in the column direction Y) of the light receiving surface 50 in the row direction X, a component of incident light in the row direction X is substantially vertically incident, so that the sensitivity ratio of the phase difference detecting pixel 51L and the sensitivity ratio of the phase difference detecting pixel 51R are substantially the same.

As described above, the solid state imaging element 5 in which the phase difference detecting pixels 51R and the phase difference detecting pixels 51L are mounted has the characteristic of the sensitivity ratio as illustrated in FIG. 4. Therefore, other than near the optical axis position in the horizontal pixel position, output signals of the phase difference detecting pixel 51R and the phase difference detecting pixel 51L which form the phase difference pair have level differences. Accordingly, after correcting the level difference, the phase difference amount needs to be calculated.

The sensitivity ratio of the phase difference pair in the arbitrary horizontal pixel position illustrated in FIG. 4 is uniquely determined by an angle (hereinafter, referred to as an incident light ray angle) of a light ray which is incident into the horizontal pixel position. Hereinafter, the incident light ray angle will be described.

Figures 6, 7:
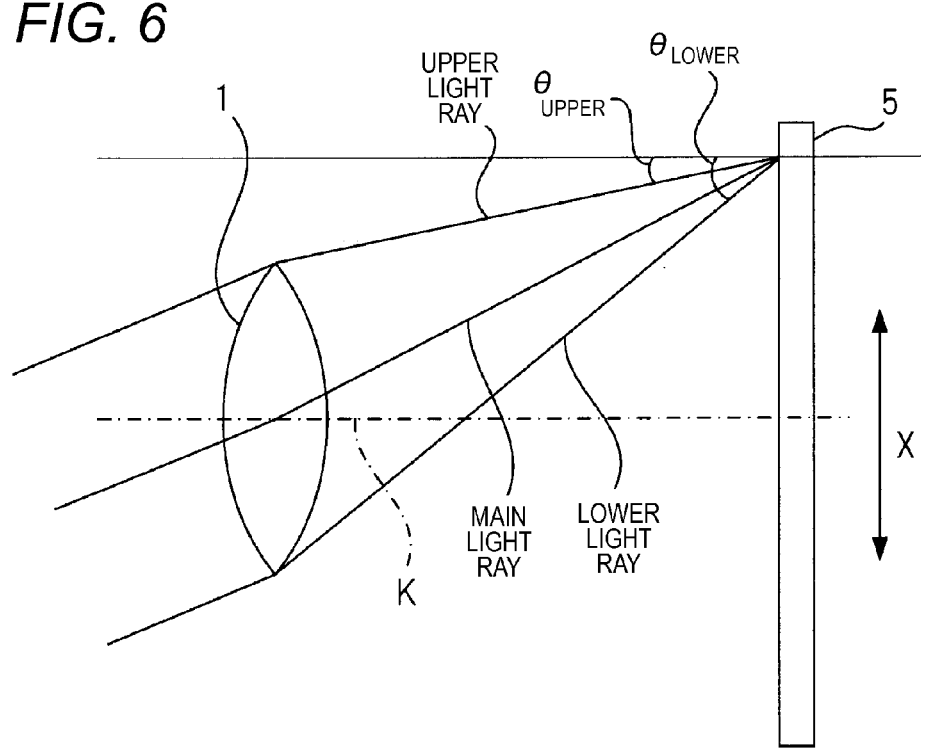
FIG. 6 is a view for explaining an angle of an incident ray in an arbitrary position of the solid state imaging element 5 in the row direction X.
FIG. 7 is a view illustrating an example of a table stored in a memory 3 of a lens device 100.

FIG. 6 is a view when the photographing lens 1 and the solid state imaging element 5 are viewed toward the column direction Y which is perpendicular to the optical axis of the photographing lens 1 and is perpendicular to the row direction X.

The light which is incident on an arbitrary horizontal pixel position of the solid state imaging element 5 includes a main light ray which passes through the center of the photographing lens 1, an upper light ray which passes through an upper end of the photographing lens 1 in FIG. 6, and a lower light ray which passes through a lower end of the photographing lens 1 in FIG. 6.

The upper light ray refers to a light ray which passes through one end (upper end) of the photographing lens 1 in the column direction Y and reaches the arbitrary horizontal pixel position. The lower light ray refers to a light ray which passes through the other end (lower end) of the photographing lens 1 in the column direction Y and reaches the arbitrary horizontal pixel position.

As illustrated in FIG. 6, when an angle (an upper light ray angle) formed by the optical axis K of the photographing lens 1 and the upper light ray is $\theta_{upper}$ and an angle (an lower light ray angle) formed by the optical axis K of the photographing lens 1 and the lower light ray is $\theta_{lower}$, the incident light ray angle at the arbitrary horizontal pixel position of the solid state imaging element 5 is defined by a combination of the upper light ray angle $\theta_{upper}$ and the lower light ray angle $\theta_{lower}$.

Even if the horizontal pixel positions are the same, when the optical conditions (an F value, a focal distance, and a combination of focus lens positions) of the imaging optical system are changed, the incident light ray angle in the horizontal pixel position is changed.

The sensitivity ratios of the phase difference detecting pixel 51R and the phase difference detecting pixel 51L have linear characteristics as illustrated in FIG. 4. Therefore, when the sensitivity ratios of the phase difference detecting pixel 51R and the phase difference detecting pixel 51L in at least two positions in the row direction X of the solid state imaging element 5 are known, the sensitivity ratios of the phase difference detecting pixel 51R and the phase difference detecting pixel 51L in all the positions in the row direction X may be calculated by linear interpolation.

The sensitivity ratios of the phase difference pair in the arbitrary horizontal pixel position are determined by the incident light ray angle in the horizontal pixel position. Further, the incident light ray angle in the arbitrary horizontal pixel position may vary depending on the type of lens device 100 or an optical condition set in the lens device 100.

Therefore, in the present embodiment, information of the incident light ray angles in at least two arbitrary positions in the row direction X of the solid state imaging element 5 when the lens device 100 is mounted in the camera main body 200 is calculated in advance for every optical condition of the lens device 100 and stored in the memory 3 of the lens device 100.

Further, in the main memory 16 of the camera main body 200, a table, in which sensitivity ratios of the phase difference pairs in arbitrary horizontal pixel positions respectively correspond to different incident light ray angles in the arbitrary horizontal pixel position, is stored. Further, when the combinations of the lens device and the imaging element are different, the sensitivity ratios of the phase difference pairs are also different. Therefore, data of the sensitivity ratios with respect to the incident light ray angle may be stored in the device in which the imaging element is mounted. Since the information of the incident light ray angle is determined by the lens, the information of the incident light ray angle may be stored in the lens device.

The information of the incident light ray angle stored in the memory 3 and the data of the table stored in the main memory 16 may be obtained by actual measurement in an adjustment process before shipment of the lens device 100 or the camera main body 200.

For example, the incident light ray angles in the horizontal pixel positions x1, x2, x3, and x4 illustrated in FIG. 4 are measured for every optical conditions 1, 2, 3, . . . which may be set in the lens device 100 and the table as illustrated in FIG. 7 is created from the measurement result and stored in the memory 3 of the lens device 100.

Further, for all the combinations considered by the upper light ray angle and the lower light ray angle, the sensitivity ratios of the arbitrary phase difference detecting pixels 51R and the phase difference detecting pixels 51L having the same horizontal pixel position are measured and the tables as illustrated in FIG. 7 are created from the measurement results to be stored in the main memory 16 of the camera main body 200. In FIG. 8, the sensitivity ratios of the phase difference detecting pixels 51R are denoted by R1, R2, and R3 and the sensitivity ratios of the phase difference detecting pixels 51L are denoted by L1, L2, and L3.

The system control unit 11 corrects the level difference of the output signals of the phase difference pairs using the information stored in the memory 3 of the lens device 100 and the table stored in the main memory 16. For example, a correction coefficient for correcting the level difference of the output signals of the phase difference pair is created and the correction coefficient is multiplied to an output signal of at least one of the phase difference pair to correct the level difference of the output signals of the phase difference pair.

The defocus amount calculating unit 19 calculates the phase difference amount between an image captured by the phase difference detecting pixel 51R and an image captured by the phase difference detecting pixel 51L using the output signals of the phase difference pair which are corrected by the system control unit 11, and calculates a defocus amount based on the calculated phase difference amount.

An operation of the digital camera configured as described above will be described.

Figure 9:
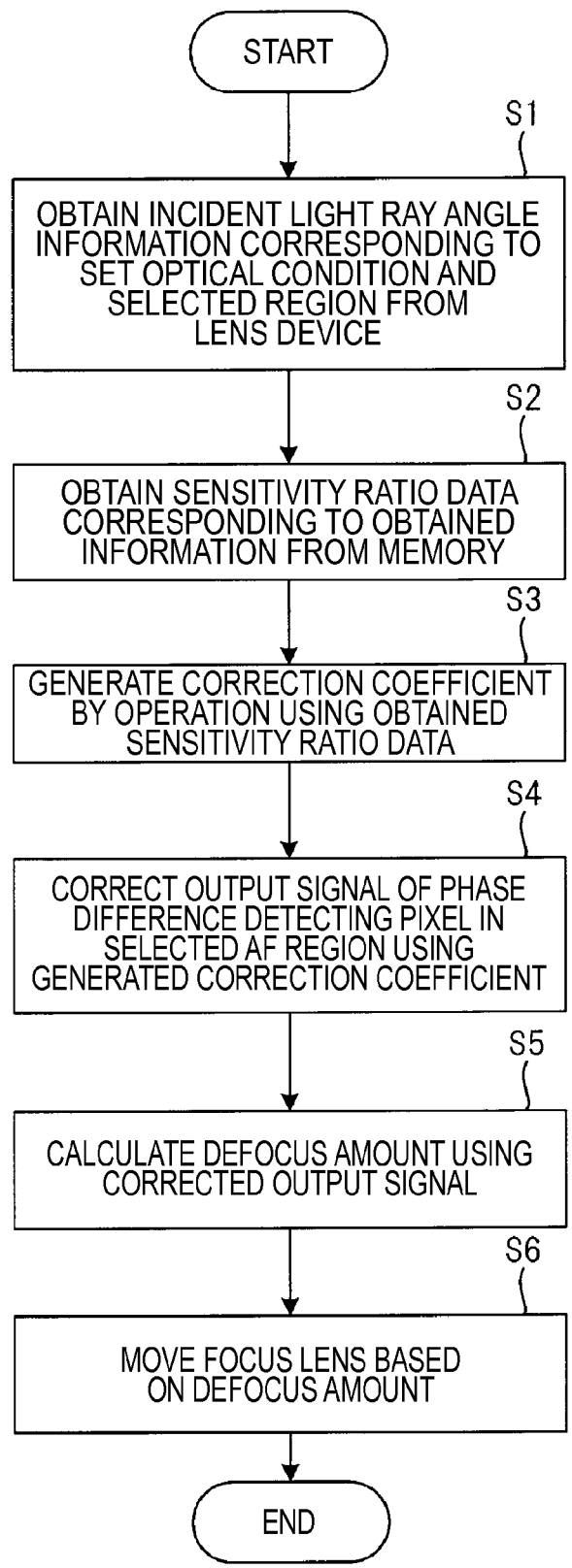
FIG. 9 is a flow chart for explaining an operation of the digital camera illustrated in FIG. 1.

FIG. 9 is a flow chart for explaining an operation after issuing an AF instruction of the digital camera illustrated in FIG. 1.

When a photographing mode is set and the AF instruction is made by a half-push operation of a shutter button, a captured image signal obtained by the solid state imaging element 5 at a time when the AF instruction is made is stored in the main memory 16.

Further, the system control unit 11 obtains information of the incident light ray angle in accordance with the position of the selected AF region 52 among information of the incident light ray angle in the memory 3 corresponding to the optical condition of the lens device 100 set at the time when the AF instruction is made (step S1).

For example, when any one of three AF regions 52 at the left end in FIG. 3 is selected, the system control unit 11 obtains information of the incident light ray angle corresponding to the positions x1 and x2 of both ends of the selected AF region 52, among information of the incident light ray angle corresponding to the set optical condition, from the memory 3.

Further, when any one of three AF regions 52 at the center in FIG. 3 is selected, the system control unit 11 obtains information of the incident light ray angle corresponding to the positions x2 and x3 of both ends of the selected AF region 52, among information of the incident light ray angle corresponding to the set optical condition, from the memory 3.

Further, when any one of three AF regions 52 at the right end in FIG. 3 is selected, the system control unit 11 obtains information of the incident light ray angle corresponding to the positions x3 and x4 of both ends of the selected AF region 52, among information of the incident light ray angle corresponding to the set optical condition, from the memory 3.

Next, the system control unit 11 obtains the data of the sensitivity ratios of the phase difference detecting pixel 51R and the phase difference detecting pixel 51L corresponding to the information of two incident light ray angles obtained in step S1, from the main memory 16 (step S2).

For example, when any one of three AF regions 52 at the left end in FIG. 3 is selected, in step S2, data of four sensitivity ratios including the sensitivity ratio L1 of the phase difference detecting pixel 51L corresponding to the position x1, the sensitivity ratio R1 of the phase difference detecting pixel 51R corresponding to the position x1, the sensitivity ratio L2 of the phase difference detecting pixel 51L corresponding to the position x2, and the sensitivity ratio R2 of the phase difference detecting pixel 51R corresponding to the position x2 are read from the main memory 16.

The system control unit 11 generates a function representing the sensitivity ratio of the phase difference detecting pixel 51R and a function representing the sensitivity ratio of the phase difference detecting pixel 51L from the data of the four sensitivity ratios obtained in step S2.

Figure 10:
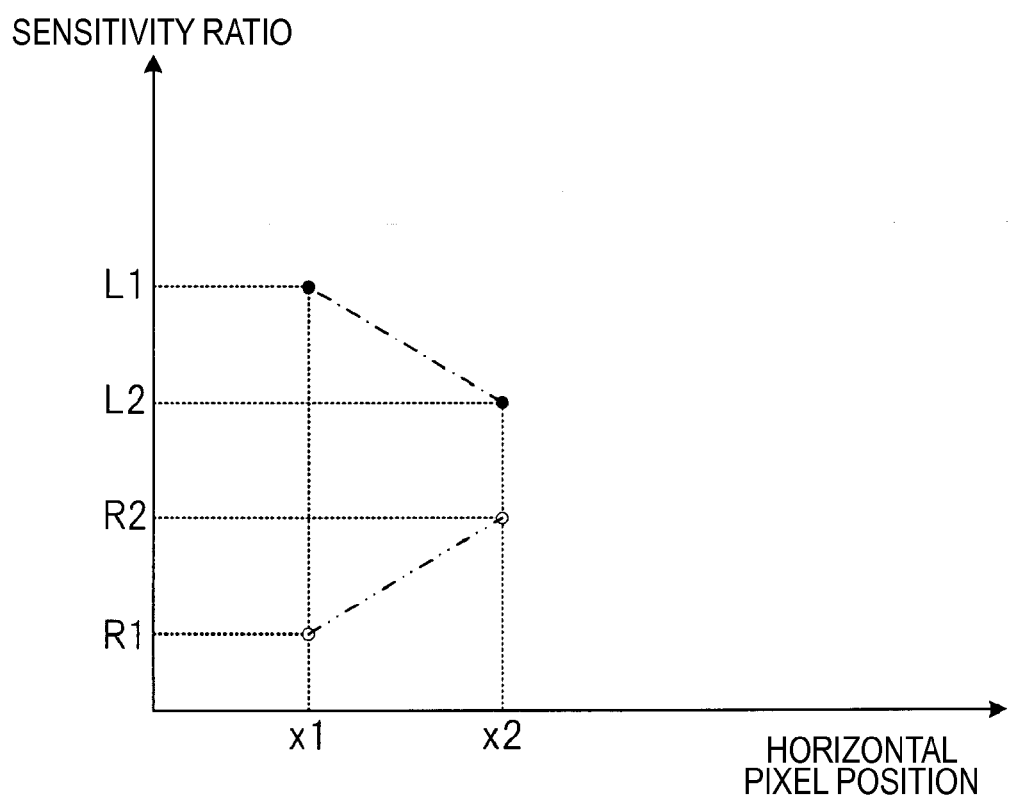
FIG. 10 is a view illustrating a linear interpolation process of a sensitivity ratio of the digital camera illustrated in FIG. 1.

For example, when the sensitivity ratios L1, L2, R1, and R2 are obtained as illustrated in FIG. 10, the function (a function representing a straight line represented by a two-dot chain line in the drawing) of the sensitivity ratio of the phase difference detecting pixel 51R having the horizontal pixel position as a variable may be generated from a distance between x1 and x2 and the values of R1 and R2.

Further, the function (a function representing a straight line represented by a one-dot chain line in the drawing) of the sensitivity ratio of the phase difference detecting pixel 51L having the horizontal pixel position as a variable may be generated from a distance between x1 and x2 and the values of L1 and L2.

The system control unit 11 generates a correction coefficient which needs to be multiplied to the phase different pair from the two functions generated as described above in order to equalize the sensitivity ratios of the phase difference pair in the horizontal pixel position for every horizontal pixel position where the phase difference pair in the selected AF region 52 is present (step S3).

Next, the system control unit 11 obtains the output signal of the phase difference pair in the selected AF region 52, from the captured image signal stored in the main memory 16.

The system control unit 11 multiplies the correction coefficient generated for the horizontal pixel position of the phase difference pair and the obtained output signal of the phase difference pair to correct the output signal of the phase difference pair (step S4).

Further, the system control unit 11 may generate a correction coefficient which needs to be multiplied to one of the phase different pair from the two functions generated as described above in order to equalize the sensitivity ratios of the phase difference pair in the horizontal pixel position for every horizontal pixel position where the phase difference pair in the selected AF region 52 is present, and correct the output signal of only one of the phase difference pair using the correction coefficient in step S4.

By the correction process of FIG. 4, the output signals of the phase difference pair do not have level differences in any of horizontal pixel positions in the selected AF region 52.

After the correction process of step S4, the defocus amount calculating unit 19 calculates the phase difference amount by the correlation operation using the output signals of the phase difference pair which is corrected and calculates the defocus amount based on the calculated phase difference amount (step S5).

The system control unit 11 performs a focus control to move the focus lens to a focusing position based on the defocus amount calculated in step S5 (step S6) and then is in an imaging standby state.

As described above, according to the digital camera illustrated in FIG. 1, the data of the sensitivity ratio corresponding to the incident light ray angle stored in the main memory 16 may be read out from the information of the incident light ray angle stored in the memory 3 of the lens device 100 and the level difference of the output signals of the phase difference pair may be corrected using the data of the read sensitivity ratio, and then the phase difference amount may be calculated. Therefore, the precision for calculating the phase difference amount may be improved and the phase difference AF may be performed with high precision.

Further, according to the digital camera illustrated in FIG. 1, the correction coefficient may be generated using the information of the incident light ray angle stored in the lens device 100 and the internal table. Therefore, as compared with a method which determines the level difference of the output signal of the phase difference pair from the captured image signal and generates the correction coefficient from the level difference, a time to completely correct the output signal of the phase difference pair is shortened, so that the phase difference AF may be accelerated.

Further, only the information of the upper light ray angle and the lower light ray angle in the arbitrary horizontal pixel position may be stored in the memory 3 of the lens device 100. Therefore, the adjustment process before shipment of the lens device 100 may be sufficiently shortened and thus, the manufacturing cost of the lens device 100 may be suppressed.

Further, in order for the system control unit 11 to create a function representing the straight line of two sensitivity ratios as represented in FIG. 3, it is sufficient if the information of the incident light ray angle in two arbitrary positions (limited to the position where the phase difference pair is disposed) in the row direction X of the solid state imaging element 5 is provided.

Accordingly, the information amount stored in the memory 3 of the lens device 100 may be further reduced than the above-mentioned example. In this case, the incident light ray angle may be measured only at two positions of the row direction X. Therefore, a time required for generating information to be stored in the memory 3 is also shortened.

Figure 11:
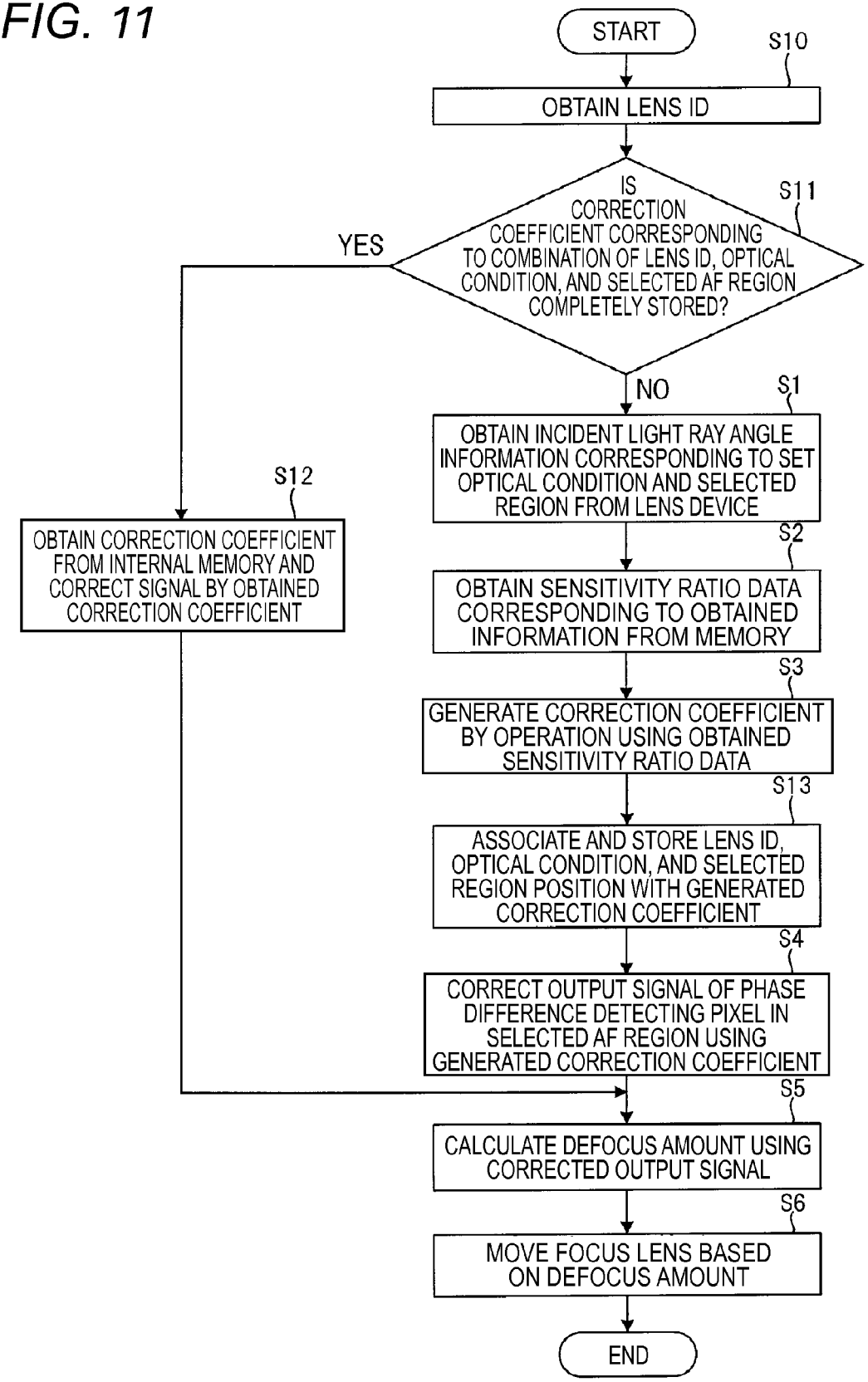
FIG. 11 is a flow chart for explaining a modified embodiment of an operation of the digital camera illustrated in FIG. 1.

FIG. 11 is a flow chart for explaining a modified embodiment of an operation after issuing an AF instruction of the digital camera illustrated in FIG. 1. The processes of FIG. 11 which are the same as the processes in FIG. 9 are denoted by the same reference symbols.

When a photographing mode is set and the AF instruction is made, a captured image signal obtained by the solid state imaging element 5 at a time when the AF instruction is made is stored in the main memory 16.

Further, when the AF instruction is made, the system control unit 11 obtains identification information (a lens ID) of the lens device 100 which is stored in the memory 3 of the lens device 100 (step S10).

The system control unit 11 determines whether the correction coefficient for every phase difference pair is stored in the main memory 16, with respect to the combination of the obtained lens ID, the optical condition of the lens device 100 at the time when the AF instruction is made, and the position (any one of the left end, the center, and the right end) in the row direction X of the AF region 52 selected at the time when the AF instruction is made (step S11).

When the correction coefficient is already stored (Yes in step S10), the system control unit 11 obtains the correction coefficient which is completely stored from the main memory 16 in step S12, and corrects the output signals of the phase difference pair in the selected AF region 52 using the obtained correction coefficient. Thereafter, processes subsequent to step S5 are performed.

When the correction coefficient is not stored (No in step S11), the system control unit 11 performs processes of step S1 to step S3.

Thereafter, the system control unit 11 stores the correction coefficient generated in step S3, the lens ID obtained in step S10, the set optical condition, and the position of the selected AF region 52 in the row direction X in the main memory 16 to be associated with each other (step S13). Subsequently to step S13, processes subsequent to step S4 are performed.

As described above, the system control unit 11 generates the correction coefficient for every phase difference pair with respect to the combination of the arbitrary optical condition and the arbitrary AF region 52, and then sets the arbitrary optical condition, and when the AF region 52 is selected to issue the AF instruction, the system control unit 11 corrects the output signal of the phase difference pair using the correction coefficient which is already generated and stored. By doing this, as compared with the case in which the correction coefficient is always generated, the operation amount may be reduced, the phase difference AF may be accelerated, and the energy saving may be achieved.

Figure 12:
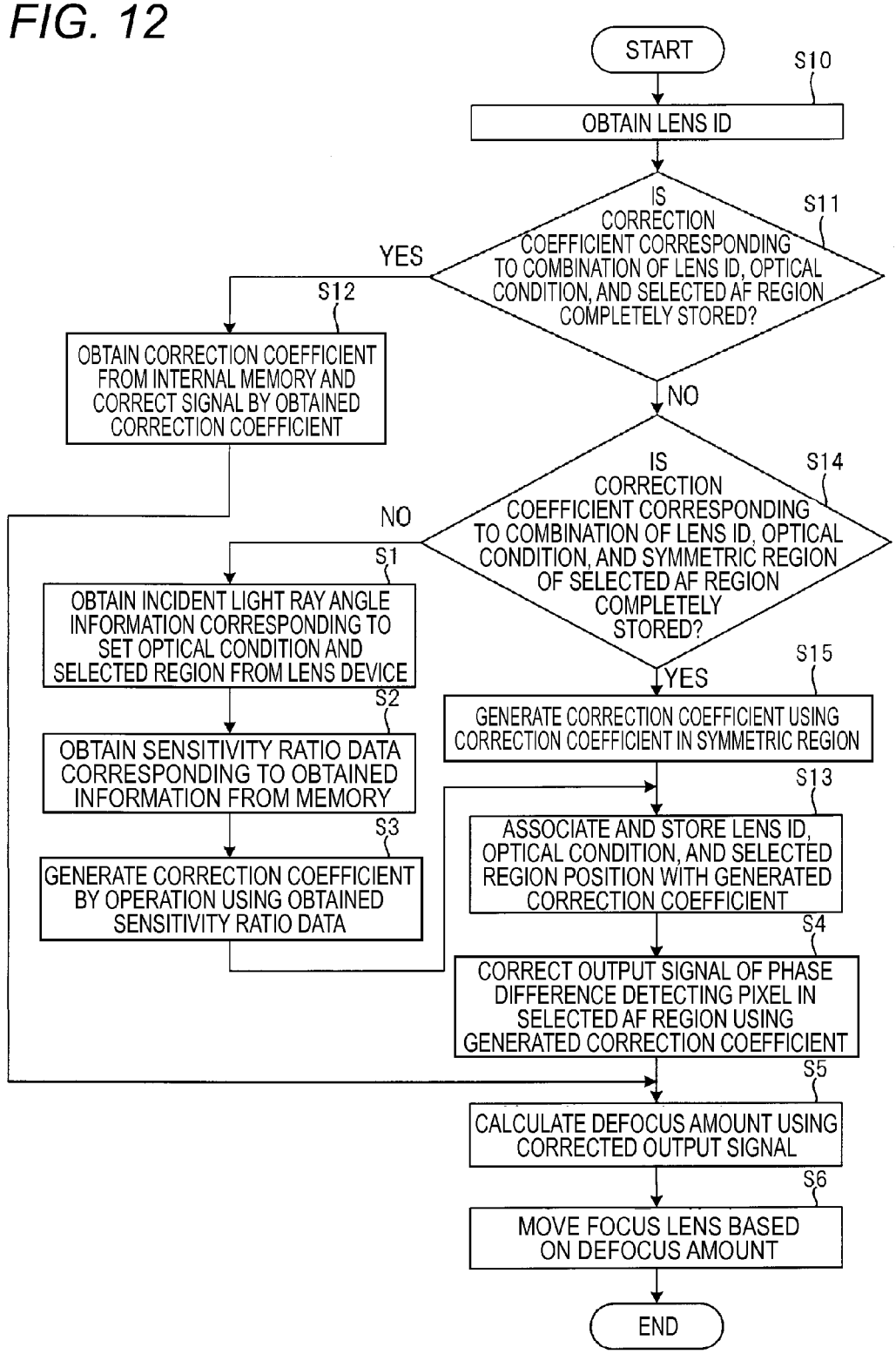
FIG. 12 is a flow chart for explaining another modified embodiment of an operation of the digital camera illustrated in FIG. 1.

FIG. 12 is a flow chart for explaining another modified embodiment of an operation after issuing an AF instruction of the digital camera illustrated in FIG. 1. Processes of FIG. 12 which are the same as the processes in FIG. 11 are denoted by the same reference symbols.

When the determination in step S11 is No, the system control unit 11 determines whether a correction coefficient corresponding to the combination of an AF region 52 (hereinafter, referred to as a symmetric region) which is line-symmetrical with respect to the selected AF region 52, the lens ID obtained in step S10, and the optical condition of the lens device 100 at the time when the AF instruction is issued is stored in the main memory 16 (step S14).

Two AF regions 52, which are line-symmetrical to each other with a straight line, which passes through an intersection with an optical axis in the light receiving surface 52 and extends in the column direction Y, as an axis, are referred to as line-symmetric AF regions.

When the correction coefficient for the combination of the lens ID, the optical condition, and the symmetric region is stored (Yes in step S14), the system control unit 11 generates the correction coefficient for the AF region 52 and the optical condition which are currently set, using the correction coefficient for the combination of the lens ID, the optical condition, and the symmetric region (step S15). After step S15, processes subsequent to step S13 are performed.

As illustrated in FIG. 4, in the AF region 52 in the range 52L and the AF region 52 of the range 52R which is line symmetrical to the AF region 52 in the range 52L, the straight lines of the sensitivity ratios have an inverse relationship.

Therefore, for the two AF regions 52, which are line-symmetrical to each other with a straight line, which passes through an intersection with an optical axis in the light receiving surface 52 and extends in the column direction Y, as an axis, a correction coefficient for the phase difference detecting pixel 51R (phase difference detecting pixel 51L) in the horizontal pixel position which is spaced apart with an arbitrary distance from the optical axis position in one AF region 52 becomes a correction coefficient for the phase difference detecting pixel 51L (phase difference detecting pixel 51R) in the horizontal pixel position which is spaced apart with the arbitrary distance from the optical axis position in the other AF region 52.

As described above, for the two AF regions 52 which are line symmetric to each other, when the correction coefficient is completely generated for one of the AF regions 52, a correction coefficient for the other AF region 52 is instantly generated using the completely generated correction coefficient, so that high speed phase difference AF is enabled.

Further, when an AF region 52 which is line-symmetric to the selected AF region 52 does not exist, the system control unit 11 does not perform the determination in step S14 and performs processes subsequent to step S1. Further, even when the determination in step S14 is No, the system control unit 11 performs processes subsequent to step S1.

In the descriptions of FIGS. 11 and 12, the correction coefficient is generated and stored for every selected AF region 52. However, the system control unit 11 may generate the correction coefficient for every position of all phase difference pairs included in the solid state imaging element 5, from the function of the sensitivity ratio generated using the data of the sensitivity ratio obtained in step S2 and divides the correction coefficient for every position of the AF regions 52 to be stored in the main memory 16.

Further, in FIG. 3, even though the AF region 52 is provided in a part of the light receiving surface 50, the AF region 52 may be set in the entire light receiving surface 50 without having any gap.

Until now, the pixels 51 have been exemplified to be arranged in a so-called honey comb arrangement. However, the present invention is applicable to a solid state imaging element in which the pixels 51 are arranged in a square lattice pattern.

Further, until now, it has been described that the solid state imaging element 5 includes a plurality of colors of color filters mounted therein to perform colored imaging. However, the solid state imaging element 5 may have a green color filter or omit the color filters to serve as an imaging element for monochromic imaging.

Further, until now, the digital camera has been exemplified as an imaging device. However, the technology of the present embodiment may also be applied to the smart phone with the camera attached thereto.

Next, a configuration of a smart phone with a camera attached thereto will be described.

Figure 13:
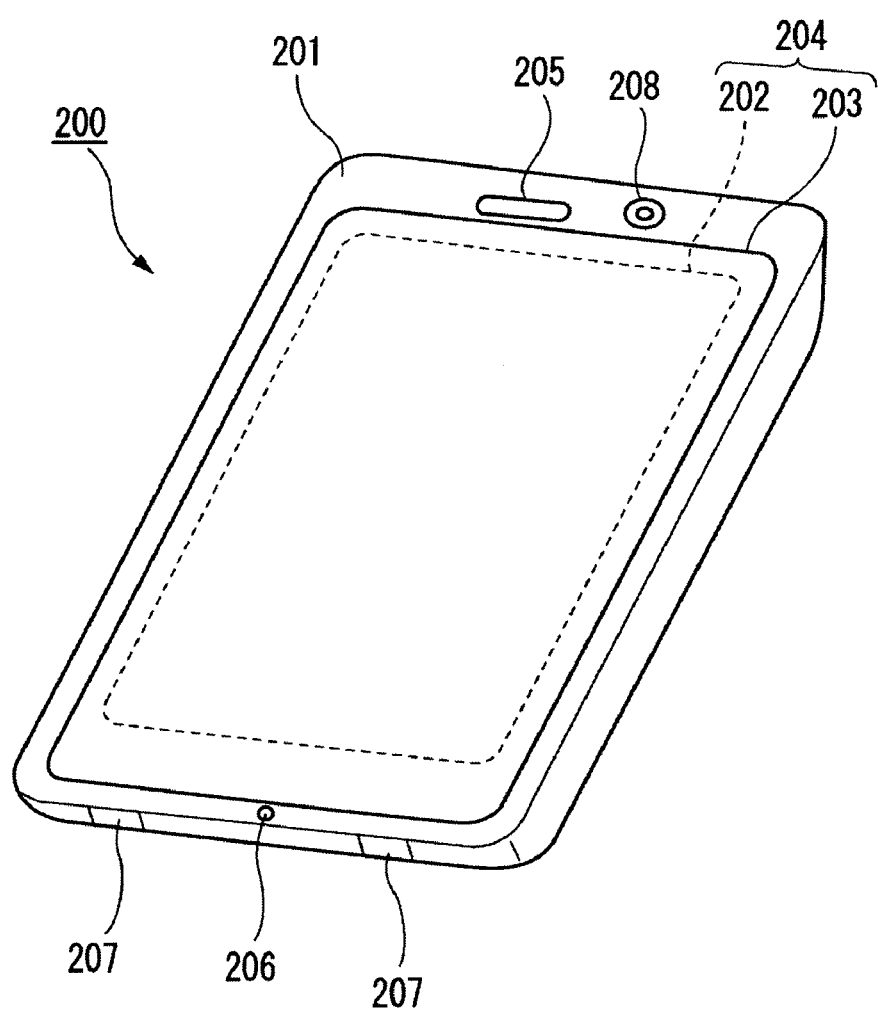
FIG. 13 is a view explaining a smart phone as an imaging device.

FIG. 13 illustrates an outer appearance of a smart phone 200 which is an embodiment of the photographing device of the present invention. The smart phone 200 illustrated in FIG. 13 includes a flat panel type case 201 and is provided, on one surface of the case 201, with a display input unit 204 in which a display panel 202 as a display unit, and an operating panel 203 as an input unit are integrated. In addition, such a case 201 includes a speaker 205, a microphone 206, an operating unit 207, and a camera 208. However, the configuration of the case 201 is not limited thereto. For example, a configuration in which the display unit and the input unit are independent from each other may be employed or a configuration having a folding structure or a slide mechanism may be employed.

Figure 14:
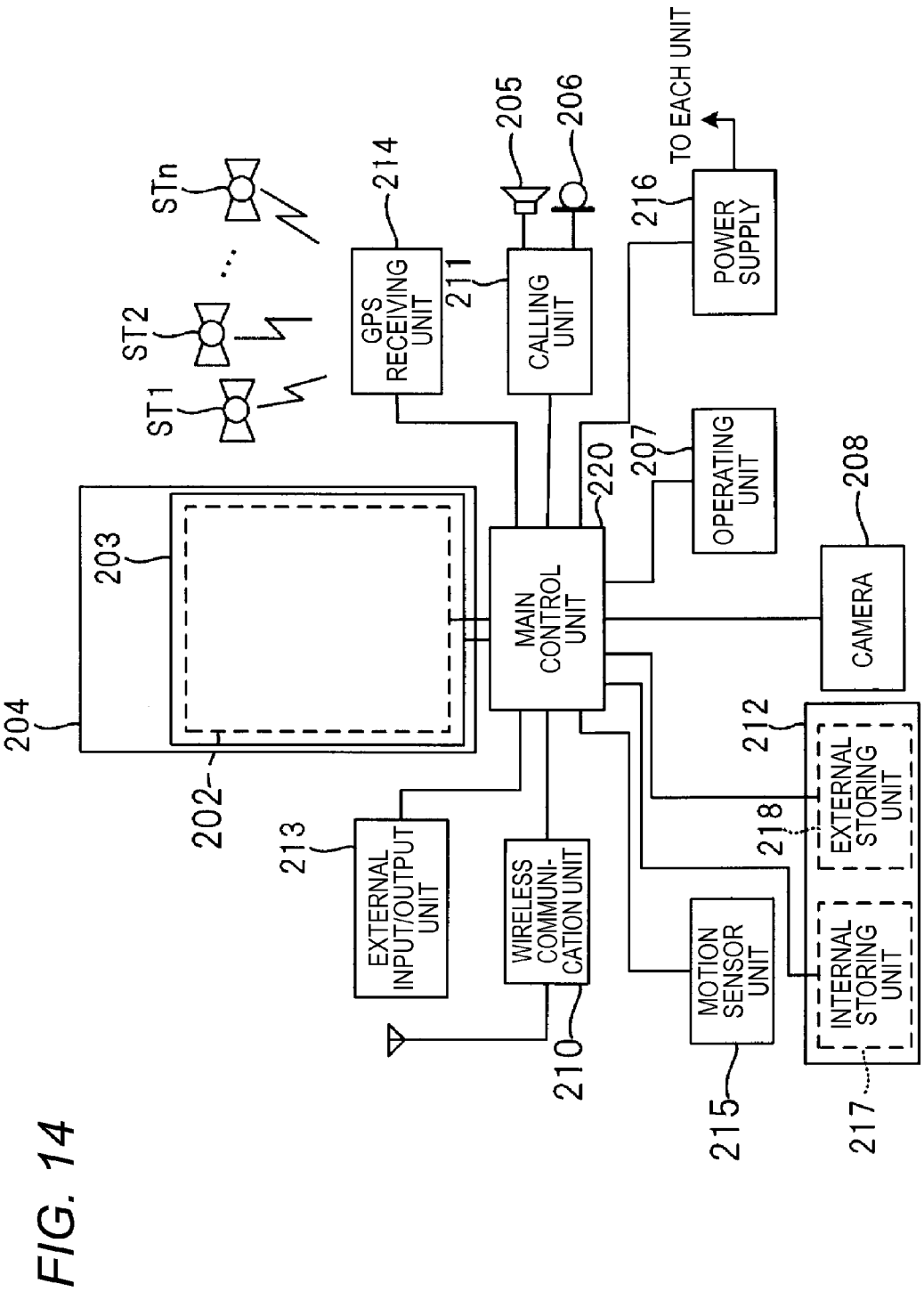
FIG. 14 is an internal block diagram of the smart phone of FIG. 13.

FIG. 14 is a block diagram illustrating a configuration of the smart phone 200 illustrated in FIG. 13. As illustrated in FIG. 14, as main components, the smart phone includes a wireless communication unit 210, a display input unit 204, a calling unit 211, an operating unit 207, a camera 208, a storing unit 212, an external input/output unit 213, a global positioning system (GPS) receiving unit 214, a motion sensor unit 215, a power supply unit 216, and a main control unit 220. Further, as a main function of the smart phone 200, the smart phone 200 is provided with a wireless communication function which performs mobile wireless communication through a base station device BS which is not illustrated and a mobile communication network NW which is not illustrated.

The wireless communication unit 210 performs wireless communication with the base station device BS accommodated in the mobile communication network NW in accordance with an instruction of the main control unit 220. The wireless communication unit 210 transmits/receives various file data such as voice data and image data and electronic mail data or receives web data or streaming data using the wireless communication.

The display input unit 204 is provided with a display panel 202 and an operating panel 203 as a so-called touch panel which displays an image (a still image or a moving picture) or text information so as to visually transmit information to a user, and detects the user's operation on displayed information, under the control of the main control unit 220.

The display panel 202 uses a liquid crystal display (LCD), an organic electroluminescence display (OELD), or the like, as a display device.

The operating panel 203 is a device which is mounted so that an image displayed on a display surface of the display panel 202 is visually recognizable, and detects one or more coordinates manipulated by a user's finger or a stylus pen. When the device is operated by the user's finger or the stylus pen, a detection signal generated based on the operation is output to the main control unit 220. Subsequently, the main control unit 220 detects an operating position (coordinate) on the display panel 202, based on the received detection signal.

As illustrated in FIG. 13, although the display panel 202 and the operating panel 203 of the smart phone 200 exemplified as an embodiment of the photographing device of the present invention are integrated with each other to constitute the display input unit 204, the operating panel 203 may be disposed to completely cover the display panel 202.

When such an arrangement is employed, the operating panel 203 may be provided with a function of detecting the user's operation on a region other than the display panel 202. In other words, the operating panel 203 may include a detection region (hereinafter, referred to as a display region) for an overlapping portion which overlaps with the display panel 202 and a detection region (hereinafter, referred to as a non-display region) for other outer peripheral edge portions which do not overlap with the display panel 202.

Although the size of the display region and the size of the display panel 202 may completely coincide with each other, both sizes do not necessarily coincide with each other. In addition, the operating panel 203 may include two sensitive regions including an outer peripheral edge portion and an inner portion other than the outer peripheral portion. Moreover, a width of the outer peripheral edge portion is appropriately designed in accordance with the size of the case 201. Moreover, as a position detecting system employed in the operating panel 203, a matrix switch system, a resistive layer system, a surface elastic wave system, an infrared system, an electromagnetic induction system, or an electrostatic capacitive system may be exemplified, and any one system may be employed.

The calling unit 211 includes the speaker 205 or the microphone 206 and converts the user's voice input through the microphone 206 into voice data to be processed by the main control unit 220, and outputs the converted voice data to the main control unit 220, or decodes voice data received by the wireless communication unit 210 or the external input/output unit 213 and outputs the decoded voice data from the speaker 205. Furthermore, as illustrated in FIG. 13, for example, the speaker 205 may be mounted on the same surface as the surface provided with the display input unit 204, and the microphone 206 may be mounted on a side surface of the case 201.

The operating unit 207 is a hardware key which uses a key switch or the like, and receives an instruction from the user. For example, as illustrated in FIG. 13, the operating unit 207 is a push button type switch which is mounted on a side surface of the case 201 of the smart phone 200 and turned on when the operating unit 207 is pressed by a finger and turned off by restoring force of a spring or the like when the finger is removed.

The storing unit 212 stores a control program or control data of the main control unit 220, application software, address data, to which names, phone numbers, or the like of communication counterparts are correlated, transmitted/received electronic mail data, web data downloaded by web browsing or downloaded content data, and temporarily stores streaming data. Further, the storing unit 212 is configured by an internal storing unit 217 which is mounted in the smart phone, and an external storing unit 218 which includes a detachable external memory slot. Furthermore, the internal storing unit 217 and the external storing unit 218 which configure the storing unit 212, are implemented by using a storing medium such as a flash memory type, a hard disk type, a multimedia card micro type, or a card type memory (for example, MicroSD (registered trademark) memory), a random access memory (RAM), or a read only memory (ROM).

The external input/output unit 213 functions as an interface with all external devices which are connected to the smart phone 200, and is configured to be directly or indirectly connected to any other external device by communication (for example, universal serial bus (USB) or IEEE1394) or a network (for example, Internet, wireless LAN, Bluetooth (registered trademark), a radio frequency identification (RFID), an infrared data association (IrDA (registered trademark)), ultra wideband (UWB: registered trademark), or a ZigBee (registered trademark).

As for the external devices connected to the smart phone 200, a wired/wireless head set, a wired/wireless external charger, a wired/wireless data port, a memory card or a SIM (subscriber identity module) card/UIM (user identity module) card connected through a card socket, an external audio/video device connected through an audio/video input/output (I/O) terminal, a wirelessly connected external audio/video device, a wiredly/wirelessly connected smart phone, a wiredly/wirelessly connected personal computer, a wiredly/wirelessly connected PDA, a wiredly/wirelessly connected personal computer, or an earphone may be exemplified. The external input/output unit 213 may transmit data which is received from such external devices to individual components in the smart phone 200 and may also allow the data in the smart phone 200 to be transmitted to an external device.

The GPS receiving unit 214 receives GPS signals which are transmitted from GPS satellites ST1 to STn according to an instruction from the main control unit 220, and performs a position measurement operation processing based on the received GPS signals to detect positions including a latitude, a longitude, and a height of the smart phone 200. In the case where the GPS receiving unit 214 is capable of obtaining positional information from the wireless communication unit 210 or the external input/output unit 213 (for example, the wireless LAN), the GPS receiving unit 214 may detect a position using the positional information.

The motion sensor unit 215 includes, for example, a three axis acceleration sensor, and detects a physical movement of the smart phone 200 according to the instruction of the main control unit 220. When the physical movement of the smart phone 200 is detected, the movement direction or acceleration of the smart phone 200 is detected. The detected result is output to the main control unit 220.

The power supply 216 supplies a power which is accumulated in a battery (not illustrated) to respective units of the smart phone 200 according to the instruction of the main control unit 220.

The main control unit 220 includes a microprocessor and operates according to a control program or control data stored in the storing unit 212 and collectively controls respective units of the smart phone 200. Further, the main control unit 220 is provided with a mobile communication control function and an application processing function to control respective units of a communication system in order to perform voice communication or data communication through the wireless communication unit 210.

The application processing function is implemented when the main control unit 220 is operated according to the application software which is stored in the storing unit 212. The application processing function includes, for example, an infrared communication function which performs data communication with a counterpart device by controlling the external input/output unit 213, an electronic mail function which transmits/receives an electronic mail, or a web browsing function which browses a web page.

Further, the main control unit 220 is provided with an image processing function of displaying an image on the display input unit 204 based on the image data (still image or moving picture data) such as received data or downloaded streaming data, or the like. The image processing function refers to a function of decoding the image data and performing image processings on the decoded result to display the image on the display input unit 204 by the main control unit 220.

Moreover, the main control unit 220 executes a display control of the display panel 202 and an operation detection control which detects a user's operation through the operating unit 207 and the operating panel 203. By executing the display control, the main control unit 220 displays an icon to activate application software or a software key such as a scroll bar, or displays a window for preparing an electronic mail. Here, the scroll bar refers to a software key for receiving an instruction to move a displayed portion of an image with respect to a large image which is not covered by the display region of the display panel 202.

In addition, when the operation detection control is executed, the main control unit 220 detects the user's operation through the operating unit 207, receives an operation on the icon or the input of a character string of an input section of the window through the operating panel 203, or receives a scroll request of a displayed image through the scroll bar.

Furthermore, by executing the operation detection control, the main control unit 220 is provided with a touch panel control function of determining whether the operating position of the operating panel 203 is an overlapping portion (display region) which overlaps the display panel 202 or an outer peripheral edge portion (non-display region) which does not overlap the display panel 202 other than the overlapping portion, and controlling a sensitive region of the operating panel 203 or a display position of the software key.

Further, the main control unit 220 may detect a gesture operation with respect to the operating panel 203, and execute a predetermined function according to the detected gesture operation. The gesture operation refers to an operation which draws a trace using a finger, designates a plurality of positions simultaneously, or combines the plurality of positions to draw a trace for at least one from the plurality of positions, rather than a simple touch operation of the related art.

The camera 208 includes a configuration other than the external memory control unit 20, the recording medium 21, the display control unit 22, the display unit 23, and the operating unit 14 in the camera main body 200 which is illustrated in FIG. 1. Captured image data generated by the camera 208 may be stored in the storing unit 212 or output through the external input/output unit 213 or the wireless communication unit 210. Although the camera 208 is mounted on the same surface as the display input unit 204 in the smart phone 200 illustrated in FIG. 13, the mounting position of the camera 208 is not limited thereto and the camera 208 may be mounted on the rear surface of the display input unit 204.

Further, the camera 208 may be used for various functions of the smart phone 200. For example, an image obtained by the camera 208 may be displayed on the display panel 202 or used as one of the operation inputs of the operating panel 203. Further, when the GPS receiving unit 214 detects the position, the position may be detected with reference to the image from the camera 208. Moreover, an optical axis direction of the camera 208 of the smart phone 200 may be determined or a current usage environment may also be determined with reference to the image from the camera 208, either without using the 3-axis acceleration sensor or using the 3-axis acceleration sensor. Of course, the image from the camera 208 can be used in an application software.

In addition, positional information obtained by the GPS receiving unit 214, voice information obtained by the microphone 206 (which may be text information obtained by performing a voice-text conversion by the main control unit or the like), or posture information obtained by the motion sensor unit 215 may be added to the image data of a still image or a moving picture to be stored in the storing unit 212 or output through the external input/output unit 213 or the wireless communication unit 210.

Even in the smart phone 200 with the above-described configuration, the solid state imaging element 5 is used as an imaging element of the camera 208 so as to enable the mounting of the lens device 100, and the camera 208 performs the processings illustrated in FIGS. 8, 10, and 11 so as to enable the high precision phase difference AF and the high quality photographing.

As described above, the specification discloses the following matters.

It is disclosed an imaging device with an imaging optical system being attachable to/detachable from the imaging device, the imaging device comprising: an imaging element including a light receiving surface, on which a plurality of imaging pixels that captures an image formed by a luminous flux passing through a pupil area of the imaging optical system, a plurality of first phase difference detecting pixels that captures one of a pair of images formed by a pair of luminous fluxes which have passed through different parts of the pupil area of the imaging optical system, and a plurality of second phase difference detecting pixels that captures the other one of the pair of images, are disposed; and a first storing unit that stores sensitivity ratio data indicating a sensitivity ratio of the first phase difference detecting pixel at an arbitrary position and the imaging pixel which is adjacent to the first phase difference detecting pixel and a sensitivity ratio of the second phase difference detecting pixel at an arbitrary position and the imaging pixel which is adjacent to the second phase difference detecting pixel, for every information of different incident light ray angles in an arbitrary position in an off-centered direction of the pair of images of the light receiving surface, wherein the imaging optical system includes a second storing unit that stores the information of the incident light ray angle of the light ray which is incident in at least two positions in the off-centered direction of the light receiving surface, through the imaging optical system, for every optical condition of the imaging optical system, and wherein the imaging device further includes: a correcting unit that obtains the information of the incident light ray angle in the at least two positions corresponding to the set optical condition from the second storing unit and corrects a level difference of the output signals of a pair of the first phase difference detecting pixel and the second pixel difference detecting pixel which is adjacent to the first phase difference detecting pixel using the sensitivity ratio data which is stored in the first storing unit corresponding to the information of the plurality of obtained incident light ray angles; and a defocus amount calculating unit that calculates a defocus amount using the corrected output signal of the pair.

In the disclosed imaging device, the correcting unit generates a correction coefficient which is multiplied by an output signal of at least one of the pair required to correct a level difference of the output signals of the pair for every pair in the same position in the off-centered direction, by an operation using the sensitivity ratio data corresponding to the information of the two incident light ray angles obtained from the second storing unit, and multiplies the generated correction coefficient and the output signal of at least one of the pair to correct the level difference of the output signals of the pair.

In the disclosed imaging device, a plurality of phase difference detecting regions which is target regions for detecting the phase difference including the plurality of pairs which is lined-up in the off-centered direction is lined-up in the off-centered direction in the light receiving surface, and the correcting unit generates the correction coefficient for every pair in the same position in the off-centered direction in the selected phase difference detecting region, by an operation using the sensitivity ratio data corresponding to the information of the two incident light ray angles obtained from the second storing unit, and multiplies the generated correction coefficient to the output signal of at least one of the pair in the selected phase difference detecting region to correct the level difference of the output signals of the pair.

In the disclosed imaging device, the correcting unit generates a new correction coefficient from the correction coefficient generated for the other of the two phase difference detecting regions, with respect to one of the two phase difference detecting regions which pass through the intersection with the optical axis of the imaging optical system on the light receiving surface and are line-symmetric to each other having a straight line which is perpendicular in the off-centered direction as an axis.

In the disclosed imaging device, the correcting unit stores the correction coefficient generated from every pair in the phase difference detecting region in a state when the arbitrary optical condition is set and the arbitrary phase difference detecting region is selected, and then performs the correction using the stored correction coefficient when the arbitrary optical condition is set and the phase difference detecting region is selected.

In the disclosed imaging device, the information of an incident light ray angle in an arbitrary position on the light receiving surface is information indicating an angle formed by an upper light ray which passes through one end of the lens in the off-centered direction and reaches the arbitrary position and the optical axis of the lens and an angle formed by a lower light ray which passes through the other end of the lens in the off-centered direction to reach the arbitrary position and the optical axis of the lens when the imaging optical system and the imaging element are seen in a direction which is perpendicular to the off-centered direction and the optical axis of the lens included in the imaging optical system.

It is disclosed an imaging optical system in the imaging device, wherein the imaging optical system is mounted in an imaging device having mounting equipment.

It is disclosed a defocus amount calculating method by an imaging device with an imaging optical system being attached to/detached from the imaging device, wherein the imaging device includes: an imaging element including a light receiving surface, on which a plurality of imaging pixels that captures an image formed by a luminous flux passing through a pupil area of the imaging optical system, a plurality of first phase difference detecting pixels that captures one of a pair of images formed by a pair of luminous fluxes which have passed through different parts of the pupil area of the imaging optical system, and a plurality of second phase difference detecting pixels that captures the other one of the pair of images, are disposed; and a first storing unit that stores sensitivity ratio data indicating a sensitivity ratio of the first phase difference detecting pixel at an arbitrary position and the imaging pixel which is adjacent to the first phase difference detecting pixel and a sensitivity ratio of the second phase difference detecting pixel at an arbitrary position and the imaging pixel which is adjacent to the second phase difference detecting pixel, for every information of different incident light ray angles in an arbitrary position in the off-centered direction of the pair of images of the light receiving surface, wherein the imaging optical system includes a second storing unit that stores the information of the incident light ray angle of the light ray which is incident in at least two positions in the off-centered direction of the light receiving surface, through the imaging optical system, for every optical condition of the imaging optical system, and wherein the method includes: a correcting step of obtaining the information of the incident light ray angle in the at least two positions corresponding to a set optical condition from the second storing unit and correcting a level difference of the output signals of a pair of the first phase difference detecting pixel and the second pixel difference detecting pixel which is adjacent to the first phase difference detecting pixel using the sensitivity ratio data which is stored in the first storing unit corresponding to the information of the plurality of obtained incident light ray angles; and a defocus amount calculating step of calculating a defocus amount using the corrected output signal of the pair.

INDUSTRIAL APPLICABILITY

The present invention is usefully applied to a digital camera.

Although the present invention has been described above using the specific embodiments, the present invention is not limited to the embodiments but various modifications may be made without departing from a technical spirit of the disclosed invention.

This application is based on Japanese Patent Application No. 2012-256349 filed on Nov. 22, 2012, of which the contents are incorporated herein by reference.

REFERENCE SIGNS LIST

5: Solid-state imaging element, 11: System control unit (correcting unit), 19: Defocus amount calculating unit, 50: Light receiving surface, 51: Pixel, 52: AF region (phase difference detecting region), 51R, 51L: Phase difference detecting pixel, X: Row direction (direction in which a pair of images are off-centered), Y: Column direction, K: Optical axis

What is claimed is:

1. An imaging device with an imaging optical system being attachable to/detachable from the imaging device, the imaging device comprising:
    an imaging element including a light receiving surface, on which a plurality of imaging pixels that capture an image formed by a luminous flux passing through a pupil area of the imaging optical system, a plurality of first phase difference detecting pixels that capture one of a pair of images formed by a pair of luminous fluxes which have passed through different parts of the pupil area of the imaging optical system, and a plurality of second phase difference detecting pixels that capture the other one of the pair of images, are disposed; and
    a first storing unit that stores sensitivity ratio data indicating a sensitivity ratio of the first phase difference detecting pixel at an arbitrary position and an imaging pixel which is adjacent to the first phase difference detecting pixel and a sensitivity ratio of the second phase difference detecting pixel at an arbitrary position and an imaging pixel which is adjacent to the second phase difference detecting pixel, for all information corresponding to different incident light ray angles in an arbitrary position in an off-centered direction of the pair of images of the light receiving surface,
    wherein the imaging optical system includes a second storing unit that stores the information of the incident light ray angle of the light ray which is incident in at least two positions in the off-centered direction of the light receiving surface, through the imaging optical system, for all optical conditions of the imaging optical system, and
    wherein the imaging device further includes:
    a correcting unit that obtains the information of the incident light ray angle in the at least two positions corresponding to the set optical condition from the second storing unit and corrects a level difference of the output signals of a pair of the first phase difference detecting pixel and the second pixel difference detecting pixel which is adjacent to the first phase difference detecting pixel using the sensitivity ratio data which is stored in the first storing unit corresponding to the information of the plurality of obtained incident light ray angles; and
    a defocus amount calculating unit that calculates a defocus amount using the corrected level difference of the output signals of the pair.

2. The imaging device of claim 1, wherein the correcting unit generates a correction coefficient which is multiplied by an output signal of at least one of the pair required to correct a level difference of the output signals of the pair for each pair in the same position in the off-centered direction, by an operation using the sensitivity ratio data corresponding to the information of the two incident light ray angles obtained from the second storing unit, and multiplies the generated correction coefficient and the output signal of at least one of the pair to correct the level difference of the output signals of the pair.

3. The imaging device of claim 2, wherein a plurality of phase difference detecting regions which are target regions for detecting the phase difference including the plurality of pairs which are lined-up in the off-centered direction are lined-up in the off-centered direction in the light receiving surface, and
    the correcting unit generates the correction coefficient for each pair in the same position in the off-centered direction in the selected phase difference detecting region, by an operation using the sensitivity ratio data corresponding to the information of the two incident light ray angles obtained from the second storing unit, and multiplies the generated correction coefficient to the output signal of at least one of the pair in the selected phase difference detecting region to correct the level difference of the output signals of the pair.

4. The imaging device of claim 3, wherein the correcting unit generates a new correction coefficient from the correction coefficient generated for the other of the two phase difference detecting regions, with respect to one of the two phase difference detecting regions which pass through the intersection with the optical axis of the imaging optical system on the light receiving surface and are line-symmetric to each other having a straight line which is perpendicular in the off-centered direction as an axis.

5. The imaging device of claim 3, wherein the correcting unit stores the correction coefficient generated from each pair in the phase difference detecting region in a state when the arbitrary optical condition is set and the arbitrary phase difference detecting region is selected, and then performs the correction using the stored correction coefficient when the arbitrary optical condition is set and the phase difference detecting region is selected.

6. The imaging device of claim 1, wherein the information of an incident light ray angle in an arbitrary position on the light receiving surface is information indicating an angle formed by an upper light ray which passes through one end of the lens in the off-centered direction and reaches the arbitrary position and the optical axis of the lens and an angle formed by a lower light ray which passes through the other end of the lens in the off-centered direction to reach the arbitrary position and the optical axis of the lens when the imaging optical system and the imaging element are disposed in a direction which is perpendicular to the off-centered direction and the optical axis of the lens included in the imaging optical system.

7. An imaging optical system, comprising: the imaging device according to claim 1, wherein the imaging optical system is mounted to the imaging device including mounting equipment.

8. A defocus amount calculating method by an imaging device with an imaging optical system being attachable to and detachable from the imaging device, wherein the imaging device includes:
an imaging element including a light receiving surface, on which a plurality of imaging pixels that capture an image formed by a luminous flux passing through a pupil area of the imaging optical system, a plurality of first phase difference detecting pixels that capture one of a pair of images formed by a pair of luminous fluxes which have passed through different parts of the pupil area of the imaging optical system, and a plurality of second phase difference detecting pixels that capture the other one of the pair of images, are disposed; and
a first storing unit that stores sensitivity ratio data indicating a sensitivity ratio of the first phase difference detecting pixel at an arbitrary position and an imaging pixel which is adjacent to the first phase difference detecting pixel and a sensitivity ratio of the second phase difference detecting pixel at an arbitrary position and an imaging pixel which is adjacent to the second phase difference detecting pixel, for all information corresponding to different incident light ray angles in an arbitrary position in the off-centered direction of the pair of images of the light receiving surface,
wherein the imaging optical system includes a second storing unit that stores the information of the incident light ray angle of the light ray which is incident in at least two positions in the off-centered direction of the light receiving surface, through the imaging optical system, for all optical conditions of the imaging optical system, and
wherein the method includes:
a correcting step of obtaining the information of the incident light ray angle in the at least two positions corresponding to a set optical condition from the second storing unit and correcting a level difference of the output signals of a pair of the first phase difference detecting pixel and the second pixel difference detecting pixel which is adjacent to the first phase difference detecting pixel using the sensitivity ratio data which is stored in the first storing unit corresponding to the information of the plurality of obtained incident light ray angles; and
a defocus amount calculating step of calculating a defocus amount using the corrected level difference of the output signals of the pair.

* * * * *